(12) United States Patent
Golitschek Edler von Elbwart et al.

(10) Patent No.: US 12,507,239 B2
(45) Date of Patent: Dec. 23, 2025

(54) TRANSMITTING FEEDBACK INFORMATION

(71) Applicant: Lenovo (Singapore) Pte. Ltd., New Tech Park (SG)

(72) Inventors: Alexander Johann Maria Golitschek Edler von Elbwart, Darmstadt (DE); Ali Ramadan Ali, Kraiburg am Inn (DE); Ankit Bhamri, Rödermark (DE); Hossein Bagheri, Urbana, IL (US); Karthikeyan Ganesan, Kronberg im Taunus (DE); Hyejung Jung, Northbrook, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 332 days.

(21) Appl. No.: 18/017,617

(22) PCT Filed: Jul. 21, 2021

(86) PCT No.: PCT/IB2021/056612
§ 371 (c)(1),
(2) Date: Jan. 23, 2023

(87) PCT Pub. No.: WO2022/018673
PCT Pub. Date: Jan. 27, 2022

(65) Prior Publication Data
US 2023/0262708 A1    Aug. 17, 2023

Related U.S. Application Data

(60) Provisional application No. 63/054,709, filed on Jul. 21, 2020.

(51) Int. Cl.
*H04W 72/21* (2023.01)
*H04L 1/1829* (2023.01)
(Continued)

(52) U.S. Cl.
CPC ........... *H04W 72/21* (2023.01); *H04L 1/1854* (2013.01); *H04L 1/1861* (2013.01); *H04L 5/0053* (2013.01); *H04W 72/23* (2023.01)

(58) Field of Classification Search
CPC .... H04W 72/21; H04W 72/23; H04L 1/1854; H04L 1/1861; H04L 5/0053; H04L 1/1664
See application file for complete search history.

(56) References Cited

U.S. PATENT DOCUMENTS

2012/0263097 A1* 10/2012 Bi .......................... H04W 72/04
                                                              370/315
2013/0077593 A1*  3/2013 Han ....................... H04L 5/0057
                                                              370/329

(Continued)

FOREIGN PATENT DOCUMENTS

WO       2019216729 A1     11/2019
WO    WO-2021146702 A1 *    7/2021   ............ H04L 1/1614

OTHER PUBLICATIONS

M. T. Kawser, M. R. Rafi, F. M. Faijus Salehin Rifat, M. F. Rahman, N. Zaki and S. Z. Rahman, "Prior Generation of Transport Blocks to Expedite HARQ Retransmissions and Uplink Transmissions Improving Latency in LTE," 2019 IEEE 5th International Conference on Computer and Communications (ICCC) (Year: 2019).*

(Continued)

*Primary Examiner* — Ayaz R Sheikh
*Assistant Examiner* — Tarell A Hampton
(74) *Attorney, Agent, or Firm* — Kunzler Bean & Adamson

(57) ABSTRACT

Apparatuses, methods, and systems are disclosed for supporting acknowledgements for DL data transmitted on UL resources. One apparatus in a mobile communication network includes a processor and a transceiver that receives signaling information from a RAN node to schedule a first (Continued)

set of PDSCH resources and a first set of corresponding PUSCH resources, where the information to schedule the first set of PDSCH resources and the first set of PUSCH resources is transmitted in a same slot. The processor determines feedback information for a PDSCH transmission received from the RAN node using the first set of PDSCH resources and controls the transceiver to send feedback information for the PDSCH transmission to the RAN node using the first set of PUSCH resources.

20 Claims, 13 Drawing Sheets

(51) Int. Cl.
*H04L 5/00* (2006.01)
*H04W 72/23* (2023.01)

(56) References Cited

U.S. PATENT DOCUMENTS

| | | | | |
|---|---|---|---|---|
| 2016/0204927 | A1* | 7/2016 | Yi | H04B 7/2615 |
| | | | | 370/280 |
| 2018/0077698 | A1 | 3/2018 | Takeda et al. | |
| 2018/0310257 | A1 | 10/2018 | Papasakellariou | |
| 2019/0215781 | A1* | 7/2019 | Jeon | H04W 52/365 |
| 2019/0253196 | A1 | 8/2019 | Medles | |
| 2019/0320431 | A1* | 10/2019 | Huang | H04L 1/1861 |
| 2019/0364592 | A1* | 11/2019 | Bhattad | H04L 1/1896 |
| 2020/0044792 | A1* | 2/2020 | Vaidya | H04L 47/34 |
| 2020/0154496 | A1* | 5/2020 | Yi | H04W 72/56 |
| 2020/0296701 | A1* | 9/2020 | Park | H04W 72/569 |
| 2020/0374884 | A1* | 11/2020 | Xing | H04W 76/27 |
| 2021/0084622 | A1* | 3/2021 | Choi | H04L 1/1812 |
| 2021/0092762 | A1 | 3/2021 | Choi et al. | |
| 2021/0204308 | A1* | 7/2021 | Takeda | H04W 72/1273 |
| 2021/0243796 | A1* | 8/2021 | Panteleev | H04W 74/08 |
| 2021/0259006 | A1* | 8/2021 | Yoshioka | H04W 72/0446 |
| 2021/0274492 | A1* | 9/2021 | Yin | H04L 1/1861 |
| 2021/0314889 | A1* | 10/2021 | Rico Alvarino | H04W 56/0045 |
| 2022/0166555 | A1* | 5/2022 | Takeda | H04L 1/188 |
| 2022/0167193 | A1* | 5/2022 | Kim | H04W 72/044 |

OTHER PUBLICATIONS

PCT/IB2021/056612, "Notification of Transmittal of the International Search Report and the Written Opinion of the International Searching Authority, or the Declaration", International Searching Authority, Oct. 21, 2021, pp. 1-13.
Qualcomm, "New WID on Extending current NR operation to 71 GHz", 3GPP TSG RAN Meeting #86 RP-193229, Dec. 9-12, 2019, pp. 1-5.
Intel Corp., "New SID: Study on supporting NR from 52.6GHz to 71 Ghz", 3GPP TSG RAN Meeting #86 RP-193259, Dec. 9-12, 2019, pp. 1-3.
3GPP, "3rd Generation Partnership Project; Technical Specification Group Radio Access Network; NR; Physical channels and modulation (Release 16)", 3GPP TS 38.211 V16.1.0, Mar. 2020, pp. 1-130.
3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

* cited by examiner

TRANSMITTING FEEDBACK INFORMATION

CROSS-REFERENCE TO RELATED APPLICATIONS

This application claims priority to U.S. Provisional Patent Application No. 63/054,709 entitled "ACKNOWLEDGEMENT TRANSMISSION IN UPLINK RESOURCES" and filed on Jul. 21, 2020 for Alexander Golitschek, Ali Ramadan Ali, Ankit Bhamri, Hossein Bagheri, Karthikeyan Ganesan, and Hyejung Jung, which application is incorporated herein by reference.

FIELD

The subject matter disclosed herein relates generally to wireless communications and more particularly relates to scheduling uplink resources for feedback information.

BACKGROUND

In certain wireless communications networks, multiple downlink control information formats may be used for indicating related to multiple downlink and uplink transmissions. Such networks may require the device to monitor these multiple downlink control information formats, and this may need quite high device processing and capability.

BRIEF SUMMARY

Disclosed are procedures for supporting acknowledgements for downlink ("DL") data transmitted on uplink ("UL") resources. Said procedures may be implemented by apparatus, systems, methods, or computer program products.

One method of a User Equipment ("UE") includes receiving signaling information from a Radio Access Network ("RAN") node to schedule a first set of Physical Downlink Shared channel ("PDSCH") resources and a first set of corresponding Physical Uplink Shared Channel ("PUSCH") resources, where the information to schedule the first set of PDSCH resources and the first set of PUSCH resources is transmitted in a same slot. The method includes determining feedback information for a PDSCH transmission received from the RAN node using the first set of PDSCH resources and sending feedback information for the PDSCH transmission to the RAN node using the first set of PUSCH resources.

One method of a RAN node includes transmitting first signaling information to a UE to schedule a first set of PDSCH resources and a first set of corresponding PUSCH resources, where the information to schedule the first set of PDSCH resources and the first set of PUSCH resources is transmitted in a same slot. The method includes transmitting a PDSCH transmission to the UE using the first set of PDSCH resources and receiving feedback information from the UE using the first set of PUSCH resources for the PDSCH transmission.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
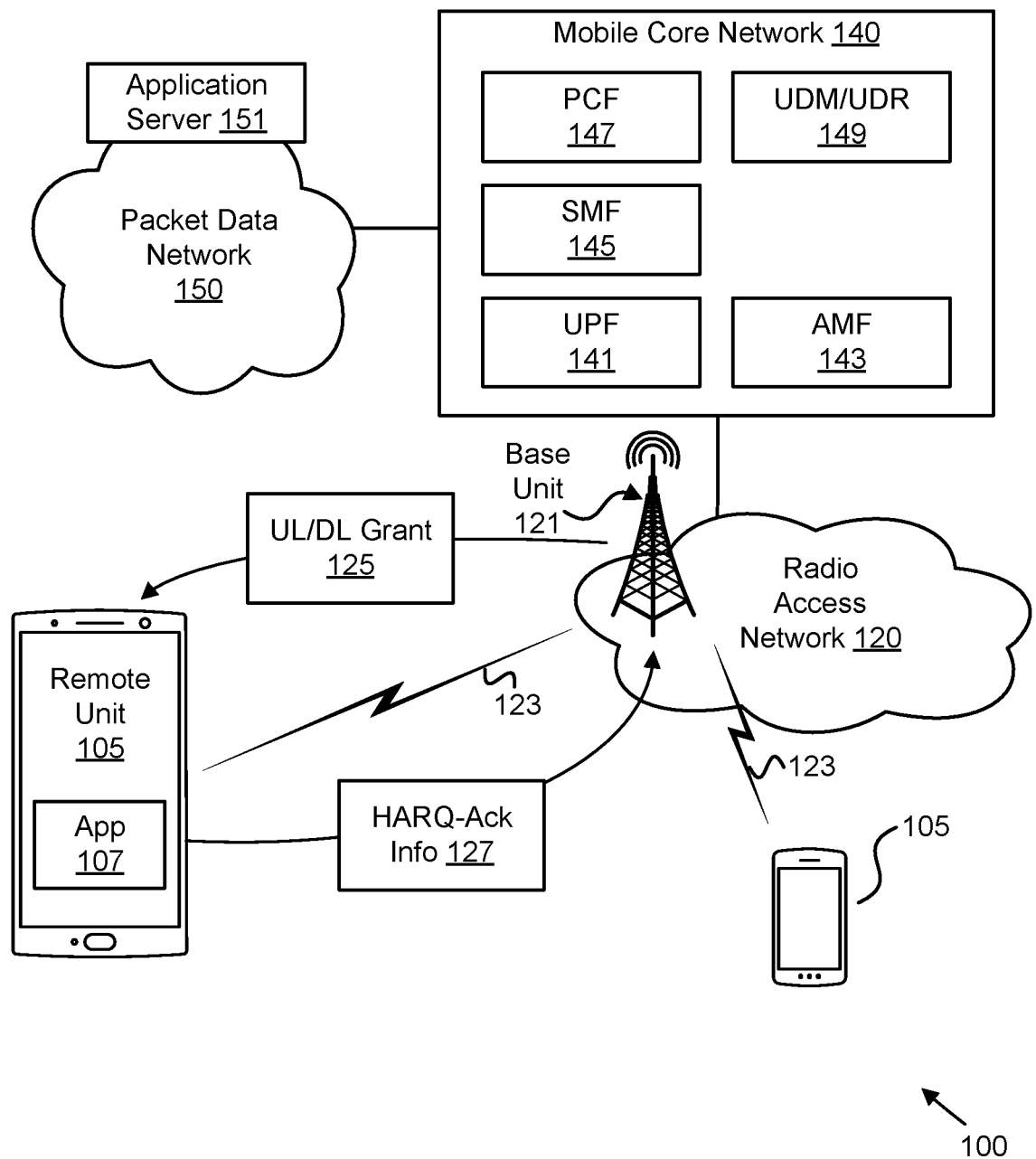
FIG. 1 is a schematic block diagram illustrating one embodiment of a wireless communication system for supporting acknowledgements for DL data transmitted on UL resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for how acknowledgements for downlink ("DL") data is transmitted on uplink ("UL") resources, where the UL resources may be granted in the same Downlink Control Information ("DCI") or at the same time as the DL resources. Especially for subcarrier spacings higher than those specified in New Radio ("NR") Rel-15, i.e., higher than 240 kHz, it is attractive to limit the number of monitored Physical Downlink Control Channel ("PDCCH") candidates to limit the corresponding power consumption by the device. This can result in sparse time instances where PDCCH is monitored and/or combined DL+UL resource allocations.

A DCI transports downlink control information for one or more cells with one Radio Network Temporary Identifier ("RNTI"). The DCI formats defined in Table 1 are supported in NR.

TABLE 1

DCI formats

| DCI format | Usage |
|---|---|
| 0_0 | Scheduling of Physical Uplink Shared Channel ("PUSCH") in one cell |
| 0_1 | Scheduling of one or multiple PUSCH in one cell, or indicating downlink feedback information for configured grant PUSCH ("CG-DFI") |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available resource block ("RB") sets, Channel Occupancy Time ("COT") duration and search space set group switching |
| 2_1 | Notifying a group of UEs of the Physical Resource Block(s) ("PRB(s)") and Orthogonal Frequency Division Multiplexing ("OFDM") symbol(s) where UE may assume no transmission is intended for the UE |
| 2_2 | Transmission of Transmit Power Control ("TPC") commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside Discontinuous Reception ("DRX") Active Time for one or more UEs |
| 3_0 | Scheduling of NR sidelink in one cell |
| 3_1 | Scheduling of LTE sidelink in one cell |

Traditionally (up to Rel-16), a DL data transmission assignment by DCI format 1_0, 1_1, 12 includes the following fields:

DCI format 1_0:

PUCCH resource indicator—3 bits as defined in Clause 9.2.3 of 3GPP TS 38.213

PDSCH-to-HARQ_feedback timing indicator—3 bits as defined in Clause 9.2.3 of 3GPP TS 38.213

DCI format 1_1:

PUCCH resource indicator—3 bits as defined in Clause 9.2.3 of 3GPP TS 38.213

PDSCH-to-HARQ_feedback timing indicator—0, 1, 2, or 3 bits as defined in Clause 9.2.3 of 3GPP TS 38.213. The bitwidth for this field is determined as $[\log_2(I)]$ bits, where I is the number of entries in the higher layer parameter dl-DataToUL-ACK DCI format 12:

PUCCH resource indicator—0 or 1 or 2 or 3 bits determined by higher layer parameter Numberofbits-for-PUCCHresourceindicator-ForDCIFormat1_2

PDSCH-to-HARQ_feedback timing indicator—0, 1, 2, or 3 bits as defined in Clause 9.2.3 of 3GPP TS 38.213. The bitwidth for this field is determined as $[\log_2(I)]$ bits, where I is the number of entries in the higher layer parameter dl-DataToUL-ACK-ForDCIFormat1_2.

To support Third Generation Partnership Project ("3GPP") 5G New Radio ("NR") between 52.6 GHz and 71 GHz (or even higher frequencies), the numerology, including subcarrier spacing ("SCS") and/or channel bandwidth ("BW"), used at higher radio frequencies may be increased. However, at the physical layer the new numerology or numerologies (i.e., µ value in 3GPP TS 38.211) for operation in this frequency range has impact on physical signals/channels and may additionally impact timeline related aspects adapted to each of the new numerologies, e.g., Bandwidth Part ("BWP") and beam switching times, Hybrid Automatic Repeat Request ("HARQ") scheduling, UE processing, preparation, and computation times for Physical Downlink Shared Channel ("PDSCH"), Physical Uplink Shared Channel ("PUSCH"), Sounding Reference Signal ("SRS") and Channel State Information ("CSI"), respectively.

Based on the existing specifications/agreements in NR, one potential solution to allow the scheduling of PDSCH and PUSCH would be to transmit an UL scheduling DCI for a PUSCH transmission in slot #n+k and to transmit a DL scheduling DCI setting the PDSCH-to-HARQ_feedback timing indicator such that the corresponding HARQ feedback is to be transmitted in slot #n+k. According to current rules, the corresponding HARQ feedback can then be multiplexed, e.g., with Uplink Shared Channel ("UL-SCH") data on the indicated PUSCH resource.

A HARQ feedback mechanism is described where the HARQ feedback for DL transmission(s) is transmitted on a PUSCH resource being indicated for example at the same time as the DL transmission(s) are indicated. The indication at the same time can be realized exemplarily by one DCI transmission that indicates simultaneously one or more PDSCH and PUSCH resources, or by two DCI transmissions in the same PDCCH monitoring occasion, with the first DCI format indicating one or more PDSCH resources and the second DCI indicating one or more PUSCH resources.

An important benefit of the HARQ feedback indication for DL transmission(s), as described herein, is to save PUCCH resources by using the indicated PUSCH resources for HARQ-ACK transmissions, and to save corresponding PDSCH-to-HARQ_feedback timing indicator fields in the DCI.

FIG. 1 depicts a wireless communication system 100 for supporting acknowledgements for DL data transmitted on UL resources, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the Third Generation Partnership Project ("3GPP") specifications. For example, the RAN 120 may be a Next Generation Radio Access Network ("NG-RAN"), implementing New Radio ("NR") Radio Access Technology ("RAT") and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, a Unified Data Management function ("UDM"") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The PCF 147 is responsible for unified policy framework, providing policy rules to CP functions, access subscription information for policy decisions in UDR. The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), an Authentication Server Function ("AUSF"), or other NFs defined for the 5GC. When present, the AUSF may act as an authentication server and/or authentication proxy, thereby allowing the AMF 143 to authenticate a remote unit 105. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for supporting acknowledgements for DL data transmitted on UL resources apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

As described in greater detail below, the base unit 121 may send a UL and/or DL grant 125 to the remote unit 105 that schedules communication resources. The base unit 121 may further send a downlink transmission (i.e., using the Physical Downlink Shared Channel ("PDSCH")). The remote unit 105 attempts to receive and decode the downlink transmission corresponding to a DL grant (also referred to as a "downlink resource assignment") indicated in the UL/DL grant 125. Using uplink resources indicated in the UL/DL grant 125, the remote unit 105 transmits feedback information, e.g., HARQ-ACK information 127, corresponding to the downlink transmission.

As used herein, "HARQ-ACK" may represent collectively the Positive Acknowledge ("ACK") and the Negative Acknowledge ("NACK") and Discontinuous Transmission ("DTX"). Signaling ACK means that a Transport Block ("TB") is correctly received. Signaling NACK (or NAK) means a TB is erroneously received (e.g., received but unsuccessfully decoded), while signaling DTX means that no TB was detected.

Described herein are procedures for supporting acknowledgements for DL data is transmitted on UL resources, where the UL resources may be granted in the same DCI or at the same time as the DL resources. In certain embodiments, remote unit 105 determines a HARQ-ACK feedback transmission timing for DL data (e.g., PDSCH) being scheduled at the same time as UL resources (e.g., PUSCH). For example, the remote unit 105 may receive a signaling from one node (e.g., gNB), where the signaling is in the form of at least one unified downlink control information ("DCI") format that indicate(s) transmission resources for at least one PDSCH transmission and at least one PUSCH transmission, and determine at least one PUSCH resource for HARQ-ACK feedback transmission out of the at least one indicated PUSCH resources. The HARQ-ACK transmission behavior considers processing time capabilities. For example, remote unit 105 may transmit HARQ-ACK information for at least one of the data blocks (i.e., TB) transmitted in the indicated PDSCH resources in at least one of the determined PUSCH resources.

In some embodiments, a PUSCH resource for transmitting the HARQ-ACK information is determined from the plurality of indicated transmission resources for PUSCH transmission as the first indicated transmission resource for PUSCH transmission after the indicated PDSCH resources for which HARQ-ACK transmission occurs. In some embodiments, the PUSCH resource for transmitting the HARQ-ACK is determined as at least a pre-determined offset of symbols after the indicated PDSCH resources for which HARQ-ACK transmission occurs.

In some embodiments, the remote unit 105 ignores a PDSCH-to-HARQ_feedback timing indicator field in the signaling. In some embodiments, the HARQ-ACK transmission occurs in one of the indicated resources for PUSCH transmission or in the resources indicated by a PDSCH-to-HARQ_feedback timing indicator field, whichever occurs earlier.

In some embodiments, the remote unit 105 transmits HARQ-ACK information for more than one data block transmitted in the indicated PDSCH resources in the same determined PUSCH resource. In some embodiments, the signaling activates both a DL Semi-Persistent Scheduling ("SPS") configuration, and an UL configured grant ("CG") configuration. In some embodiments, a first priority is assigned to a PUSCH resource and a second priority if assigned to a HARQ-ACK transmission. If the first priority is different from the second priority, then the remote unit 105 determines a different resource than the indicated PUSCH resource for the HARQ-ACK transmission.

In the following descriptions, the term "RAN node" is used for the base station but it is replaceable by any other radio access node, e.g., gNB, ng-eNB, eNB, Base Station ("BS"), Access Point ("AP"), etc. Further, the operations are described mainly in the context of 5G NR. However, the below described solutions/methods are also equally applicable to other mobile communication systems supporting acknowledgements for DL data transmitted on UL resources.

Figure 2:
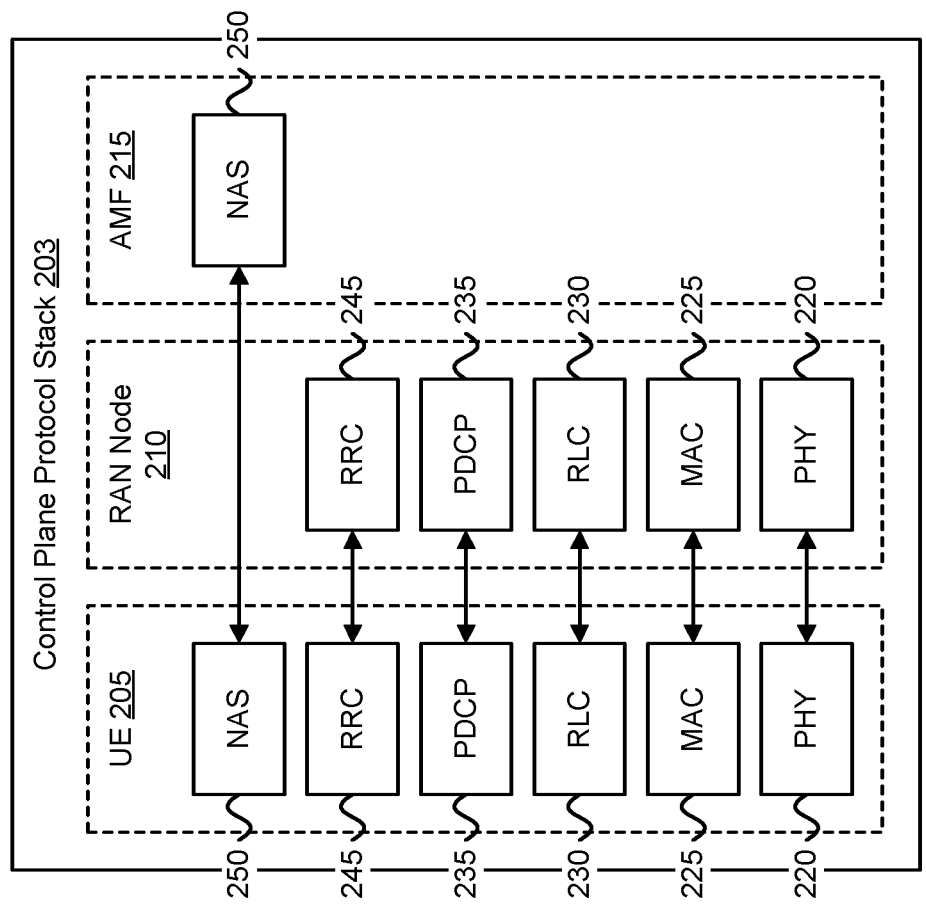
FIG. 2 is a block diagram illustrating one embodiment of a 5G New Radio ("NR") protocol stack.
Figure 2:
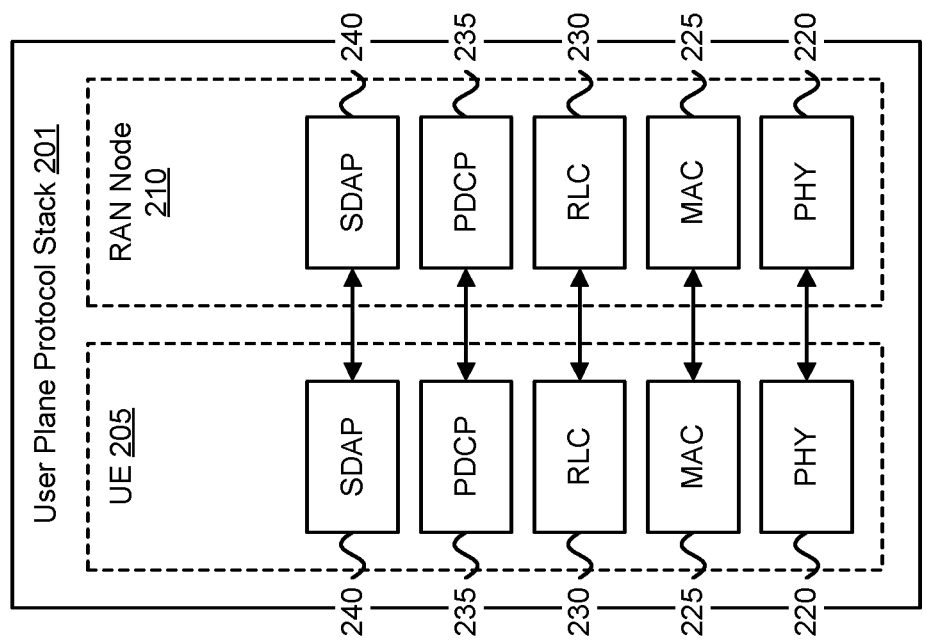

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

With very high SCS such as 480 kHz and 960 kHz, the PDCCH monitoring capability of the UE 205 is an issue. If a UE 205 is required to monitor multiple DCI formats in every slot with high SCS, then further increased UE capability might be needed. However, with the intention to not impact the UE capability, other solutions to limit the PDCCH monitoring requirements are pursued.

A HARQ feedback mechanism is proposed where the HARQ feedback for DL transmission(s) is transmitted on a corresponding PUSCH resource, for example, a PUSCH resource that is indicated at the same time that the PDSCH transmission(s) are indicated.

Beneficially, the solutions described below save PUCCH resources by using the indicated PUSCH resources for HARQ-ACK transmissions, e.g., multiplexed with UL-SCH data transmission. The below solutions also save corresponding PDSCH-to-HARQ_feedback timing indicator fields in the DCI.

The indication at the same time can be realized exemplarily by one DCI transmission that indicates simultaneously one or more PDSCH and PUSCH resources. Alternatively, the indication at the same time can be realized by two DCI transmissions in the same PDCCH monitoring occasion, with the first DCI format indicating one or more PDSCH resources and the second DCI indicating one or more PUSCH resources.

Figure 3:
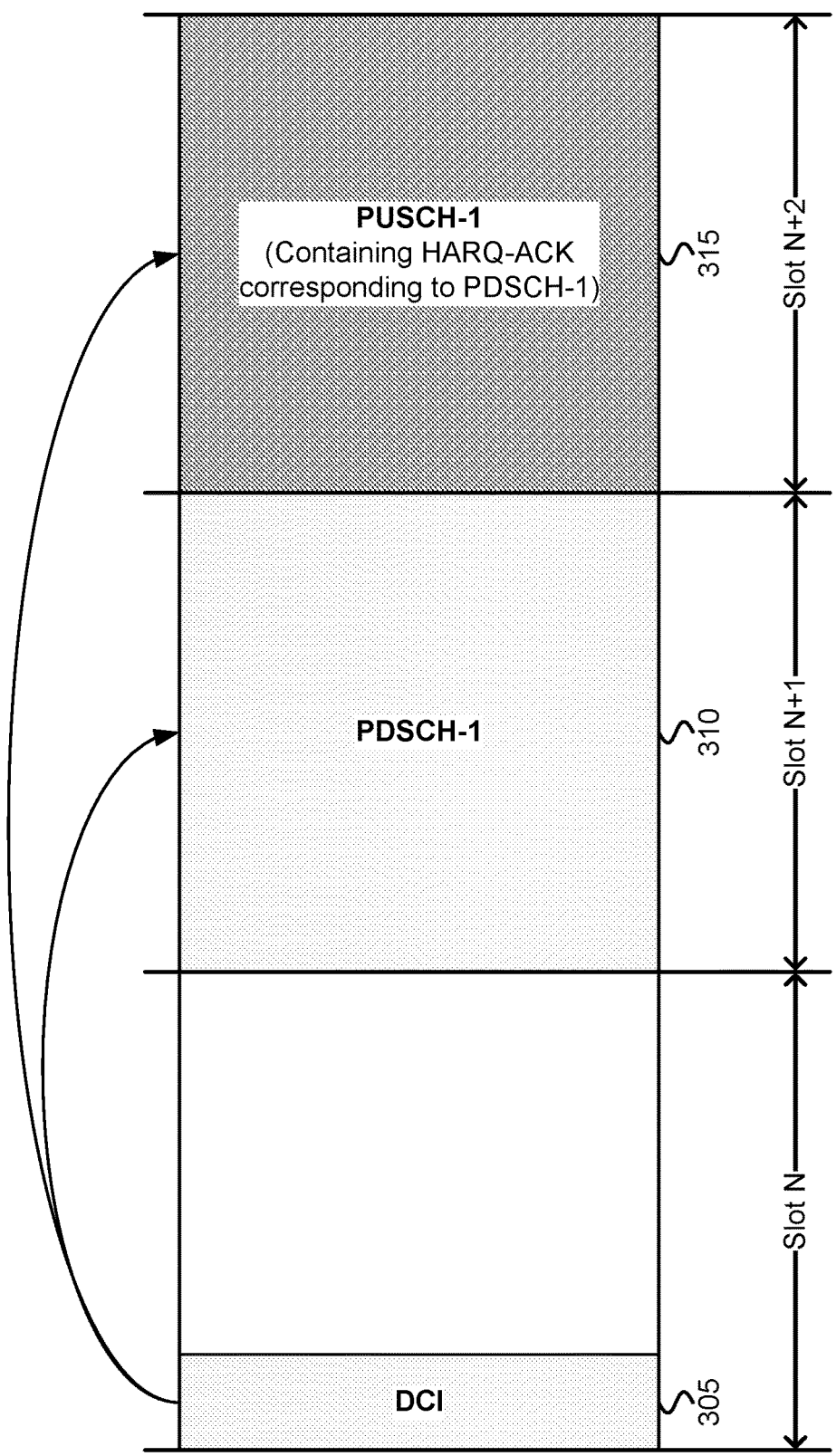
FIG. 3 is a diagram illustrating one embodiment of DL and UL (with HARQ-ACK) scheduling.

FIG. 3 depicts one example 300 of DL resource assignment and UL grant scheduling feedback information corresponding to a DL transmission received via the DL resource assignment, according to embodiments of the disclosure. In the scenario 300, a UE, such as the UE 205, receives a DCI 305, e.g., in symbols 0 and 1 of slot N, where the DCI 305 schedules resources 310 for DL transmission (e.g., PDSCH) in slot N+1 and schedules resources 315 for UL transmission (e.g., PUSCH) in slot N+2.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

Using a single, unified DCI containing both the UL resource grant and the DL resource grant is described in co-pending international application PCT/IB2021/055778 entitled "CONTROL INFORMATION THAT SCHEDULES OR ACTIVATES MULTIPLE TRANSMISSIONS" and filed on 28 Jun. 2021 for Ankit Bhamri, Alexander Golitschek, Karthikeyan Ganesan, Hyejung Jung, and Ali Ramadan Ali, which application is incorporated herein by reference. Using a single, unified DCI containing both the UL resource grant and the DL resource grant is also described in co-pending international application PCT/IB2021/055767 entitled "RESTRICTIONS BASED ON A CONFIGURED NUMEROLOGY" and filed on 28 Jun. 2021 for Ankit Bhamri, Hyejung Jung, Alexander Golitschek, Karthikeyan Ganesan, and Ali Ramadan Ali, which application is incorporated herein by reference.

As discussed above, a HARQ feedback mechanism is described where the HARQ feedback for DL transmission(s) is transmitted on a PUSCH resource being indicated for example at the same time as the DL transmission(s) are indicated, where the indication at the same time is realized by one DCI transmission that indicates simultaneously one or more PDSCH and PUSCH resources.

While the depicted embodiments show slot-based time-frequency resource grids, the described principles also apply to other intervals, such as subframes, mini-slots, timeslot, or other Transmit Time Intervals ("TTIs"). Further, while the depicted example shows the scheduled/granted DL resources spanning the entire slot N+1, in other embodiments the scheduled/granted DL resources may be for only a portion of the slot N+1. Similarly, while the depicted example shows the scheduled/granted UL resources spanning the entire slot N+2, in other embodiments the scheduled/granted UL resources may be for only a portion of the slot N+2.

While in the above description the DL resources 310 (e.g., PDSCH) and UL resources 315 (e.g., PUSCH) are each a dynamic grant scheduled using the DCI 305, in other embodiments one or both of the DL resources 310 (i.e., PDSCH) and UL resources 315 (e.g., PUSCH) may be a configured grant (i.e., semi-statically/semi-persistently scheduled resources). Here, the same principle applies that the HARQ feedback for DL transmission(s) is transmitted on a next assigned set of one or more PUSCH resources.

According to embodiments of a first solution, it is assumed that one or more PDSCH resources (e.g., TTIs) and one or more PUSCH resources (e.g., TTIs) are indicated to a UE 205 by DCI and/or higher layer configuration. HARQ feedback for the one or more PDSCH transmission(s) is transmitted on at least one of the PUSCH transmission resources. A PDSCH resource generally transmits one or more data blocks to a recipient, such as a UE 205 in a mobile communication system. A data block can be for example a transport block ("TB"), a code block group ("CBG"), or a code block ("CB").

Without loss of generality, the following description provides embodiments, implementations and examples focusing on the case that the PDSCH resource(s) and the PUSCH resource(s) are given by DCI in the same slot. However, it should be understood that the techniques described herein equally apply to the case where some or all the resources are given by higher layer configuration (such as configured grant, semi-persistent scheduling) that may optionally be activated by DCI, and/or applies equally to the case where some or all the resources are given in different transmission instances, such as in different PDCCH monitoring occasions.

According to an embodiment of the first solution, one or more PDSCH resources (e.g., TTIs) and one or more PUSCH resources (e.g., TTIs) are indicated in the same DCI. Here, HARQ feedback for the indicated PDSCH transmission(s) is transmitted on the indicated PUSCH resource.

In an embodiment of the first solution, the PUSCH resource can be a PUSCH configured grant resource, and the DCI may implicitly or explicitly indicate to transmit the HARQ feedback for the indicated PDSCH transmission(s) on the indicated PUSCH resource. In one implementation, the DCI indicates configuration index of the configured grant PUSCH. The UE 205 determines the PUSCH transmission occasion for conveying the HARQ feedback based on the indicated configuration index and UL data/control transmission timeline.

In an example, the UE 205 determines the earliest PUSCH transmission occasion of the indicated configuration index, which is after the end of the PDSCH transmission, and which satisfies a minimum transmission timeline requirement ("Tproc"). In an example, "Tproc" is determined based on the minimum processing timeline for generating HARQ feedback (e.g., the minimum configured 'K1' value). In another example, "Tproc" is signaled via RRC signaling or via a field in the DCI.

In an embodiment, a DCI activates both a DL SPS configuration, and an UL configured grant configuration. The HARQ feedback of each DL transmission of the DL SPS configuration is conveyed in a PUSCH transmission occasion of the UL configured grant transmission. The periodicity of the DL SPS configuration ("p1") and the periodicity of the UL configured grant transmission ("p2") can be the same or different. In an example, if "p1" and "p2" are different, then the HARQ feedback of some of the DL transmissions of the DL SPS configuration might be conveyed via PUSCH transmission occasions of the UL configured grant configuration (e.g., multiplexed with UL data) and the HARQ feedback of some of the DL transmissions of the DL SPS configuration might be conveyed via configured/indicated PUCCH resources.

In an implementation, the HARQ feedback of a DL transmission is conveyed in an earliest PUSCH transmission occasion ("TO") satisfying a timeline constraint (such as a minimum time after the end of the PDSCH, e.g., the PUSCH TO is at least "n1" symbols after the end of the PDSCH) and wherein the PUSCH transmission occasion is not later than a time (e.g., "n2" symbols after the end of the PDSCH transmission); if there is no such PUSCH transmission occasion, then the UE 205 would convey the HARQ feedback on a PUCCH transmission.

The embodiments may be applicable to the case that there could be a first DCI activating the DL SPS configuration, and a second DCI activating the configured grant PUSCH transmission (or even no DCI based on the configured grant type).

In another example, the HARQ feedbacks are conveyed in a PUCCH resource prior to the activation of an UL configured grant PUSCH configuration, and after activation of the UL configuration (and potentially after some time offset after the activation), (at least some of) HARQ feedbacks are conveyed in the configured PUSCH transmission occasions.

Since according to the invention, the HARQ-ACK transmission occurs in a simultaneously assigned PUSCH resource, there may be no need to include a PDSCH-to-HARQ_feedback timing indicator field in the scheduling DCI, which improves the transmission efficiency and the coverage of the DCI transmission.

Figure 4:
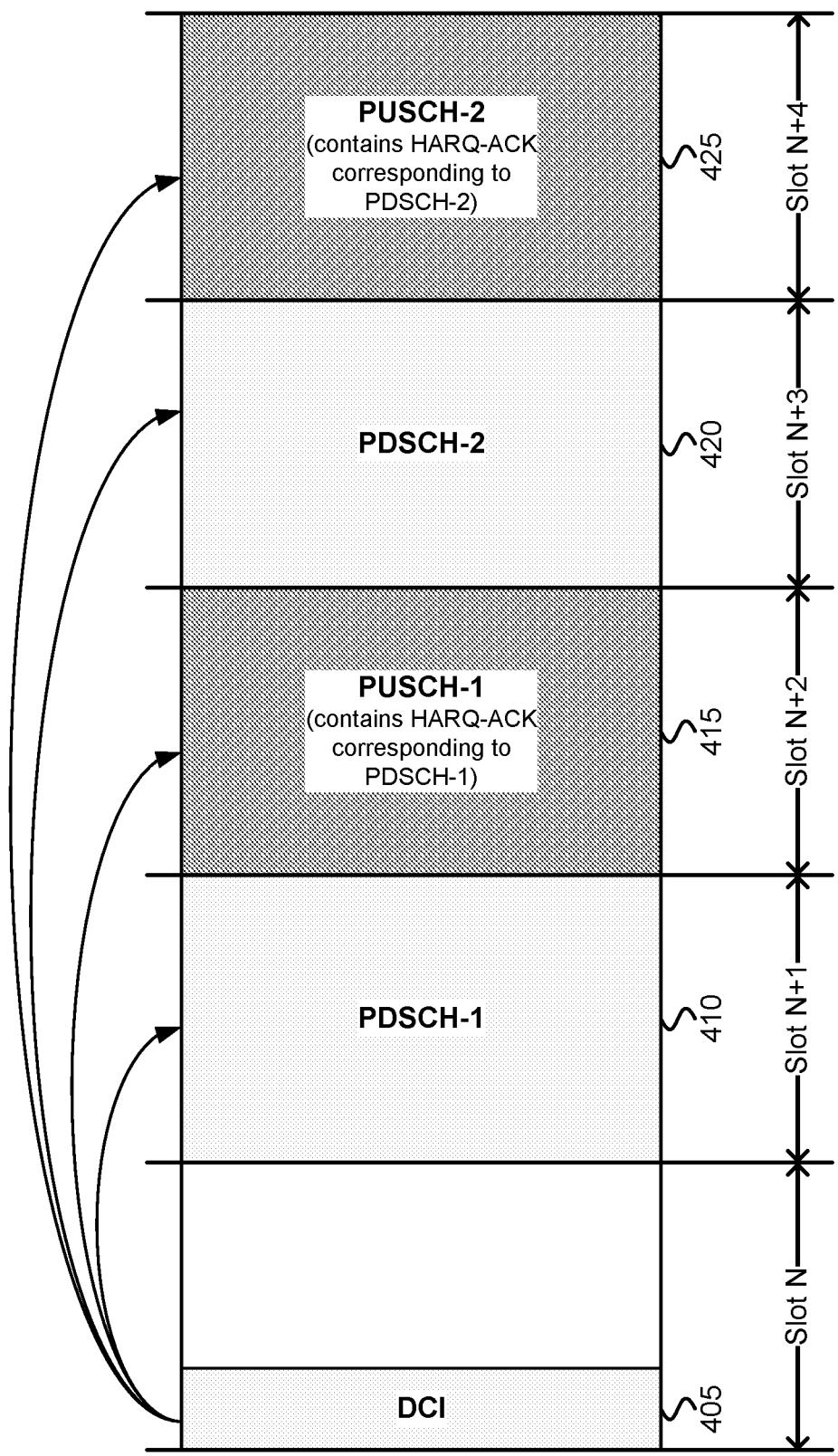
FIG. 4 is a diagram illustrating one embodiment of multiple DL and multiple UL (with HARQ-ACK) scheduling.
Figure 5:
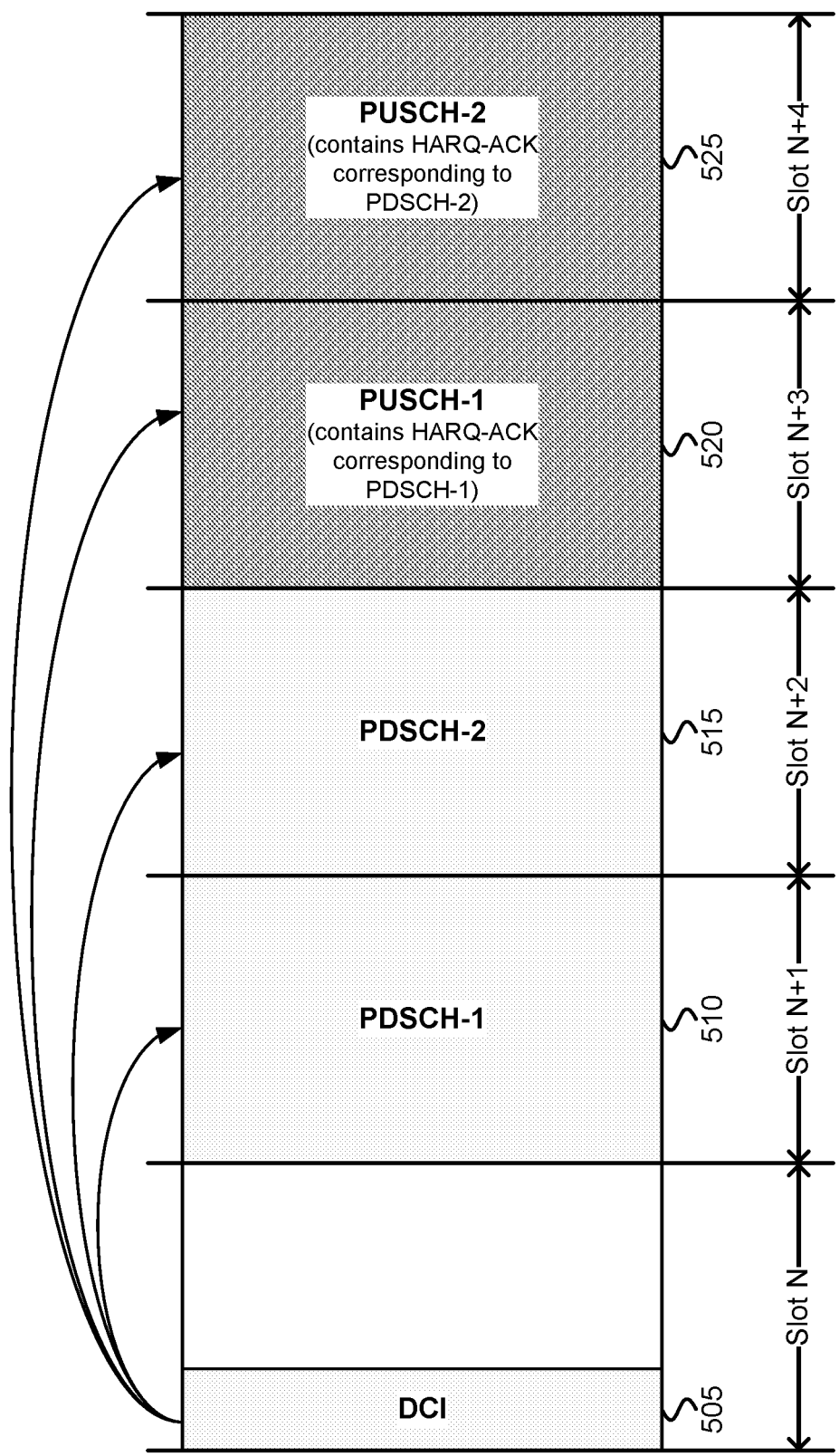
FIG. 5 is a diagram illustrating one embodiment of multiple DL and multiple UL (with HARQ-ACK) scheduling.

In one implementation, the HARQ feedback for indicated PDSCH data blocks by a DCI are transmitted in one of the PUSCH resources indicated by DCI, as shown exemplarily in FIG. 4 and FIG. 5. The PUSCH resource is determined as the earliest one that follows the assigned PDSCH resources. A PDSCH-to-HARQ_feedback timing indicator field, if present in the DCI, is therefore ignored.

FIG. 4 depicts one example scenario 400 of multiple DL resource assignment and multiple UL grant scheduling feedback information corresponding to a DL transmission received via the DL resource assignment, according to embodiments of the disclosure. In the scenario 400, the UE 205 receives a DCI 405, e.g., in symbols 0 and 1 of slot N, where the DCI 405 schedules resources 410 for DL transmission (e.g., PDSCH) in slot N+1 and schedules resources 420 for DL transmission (e.g., PDSCH) in slot N+3. Here, the DCI 405 also schedules resources 415 for UL transmission (e.g., PUSCH) in slot N+2 and resources 425 for UL transmission (e.g., PUSCH) in slot N+4.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

In the scenario 400, the PUSCH resource for feedback information transmission is determined as the earliest TTI that follows the assigned PDSCH resources. Thus, HARQ feedback for DL transmission(s) in PDSCH resources 410 is transmitted using one or more of PUSCH resources 415 and HARQ feedback for DL transmission(s) in PDSCH resources 420 is transmitted using one or more of PUSCH resources 425. In the depicted embodiment, a PDSCH-to-HARQ_feedback timing indicator field, if present in the DCI, is therefore ignored.

FIG. 5 depicts one example scenario 500 of multiple DL resource assignment and multiple UL grant scheduling feedback information corresponding to a DL transmission received via the DL resource assignment, according to embodiments of the disclosure. In the scenario 500, the UE 205 receives a DCI 505, e.g., in symbols 0 and 1 of slot N, where the DCI 505 schedules resources 510 for DL transmission (e.g., PDSCH) in slot N+1 and schedules resources 515 for DL transmission (e.g., PDSCH) in slot N+2. Here, the DCI 505 also schedules resources 520 for UL transmission (e.g., PUSCH) in slot N+3 and resources 525 for UL transmission (e.g., PUSCH) in slot N+4.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

In the scenario 500, the PUSCH resource for feedback information transmission is determined as the earliest TTI that follows the assigned PDSCH resources. Thus, HARQ feedback for DL transmission(s) in PDSCH resources 510 is transmitted using one or more of PUSCH resources 520 and HARQ feedback for DL transmission(s) in PDSCH resources 515 is transmitted using one or more of PUSCH resources 525. In the depicted embodiment, a PDSCH-to-HARQ_feedback timing indicator field, if present in the DCI, is therefore ignored.

According to another implementation suitable for transmitting HARQ-ACK feedback for at least two indicated PDSCH transmissions, the HARQ-ACK feedback for the PDSCH transmissions is aggregated and transmitted on at least one of the indicated PUSCH resource.

Figure 6:
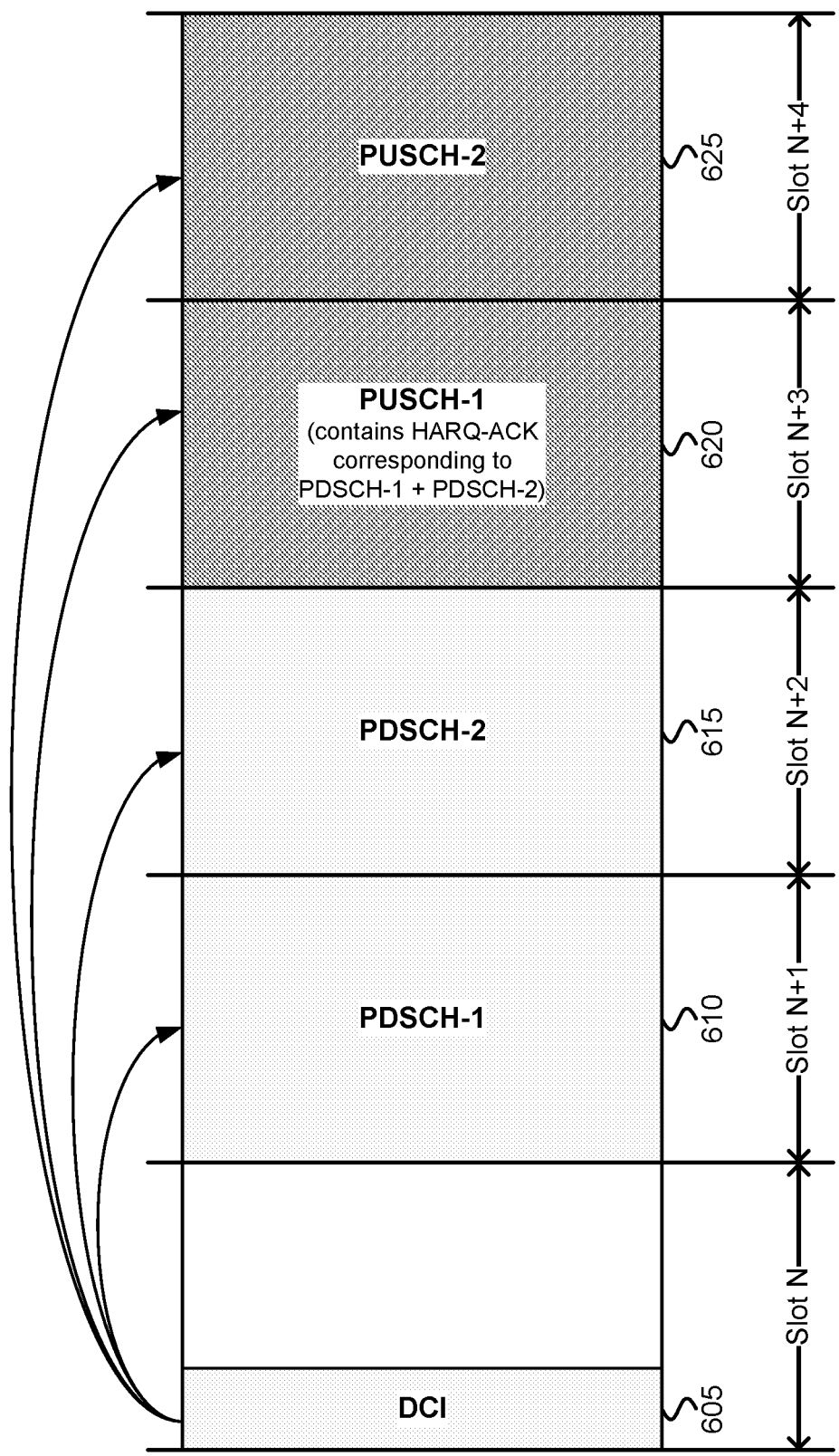
FIG. 6 is a diagram illustrating one embodiment of DL and UL scheduling with aggregated HARQ-ACK transmission on the first PUSCH resource following the last PDSCH resource.

FIG. 6 depicts one example scenario 600 of multiple DL resource assignment and multiple UL grant scheduling with aggregated feedback information transmission corresponding to a DL transmission received via the DL resource assignment, according to embodiments of the disclosure. In the scenario 600, the UE 205 receives a DCI 605, e.g., in symbols 0 and 1 of slot N, where the DCI 605 schedules resources 610 for DL transmission (e.g., PDSCH) in slot N+1 and schedules resources 615 for DL transmission (e.g., PDSCH) in slot N+2. Here, the DCI 605 also schedules resources 620 for UL transmission (e.g., PUSCH) in slot N+3 and resources 625 for UL transmission (e.g., PUSCH) in slot N+4.

The received DCI is exemplary of signaling information sent from the RAN node 210 that schedules communication resources In the depicted embodiment, the first signaling information is a single, unified DCI containing both the UL resource grant and the DL resource grant. In other embodiments, the first signaling information contains two separate DCIs scheduling UL and DL, respectively.

In the scenario 600, the aggregated HARQ-ACK feedback corresponding to the PDSCH transmissions is sent on the first indicated PUSCH resource following the last indicated PDSCH resource. Thus, HARQ feedback for DL transmission(s) in PDSCH resources 610 and HARQ feedback for DL transmission(s) in PDSCH resources 615 is aggregated and transmitted using one or more of PUSCH resources 620. In the depicted embodiment, a PDSCH-to-HARQ_feedback timing indicator field, if present in the DCI, is therefore ignored.

Figure 7:
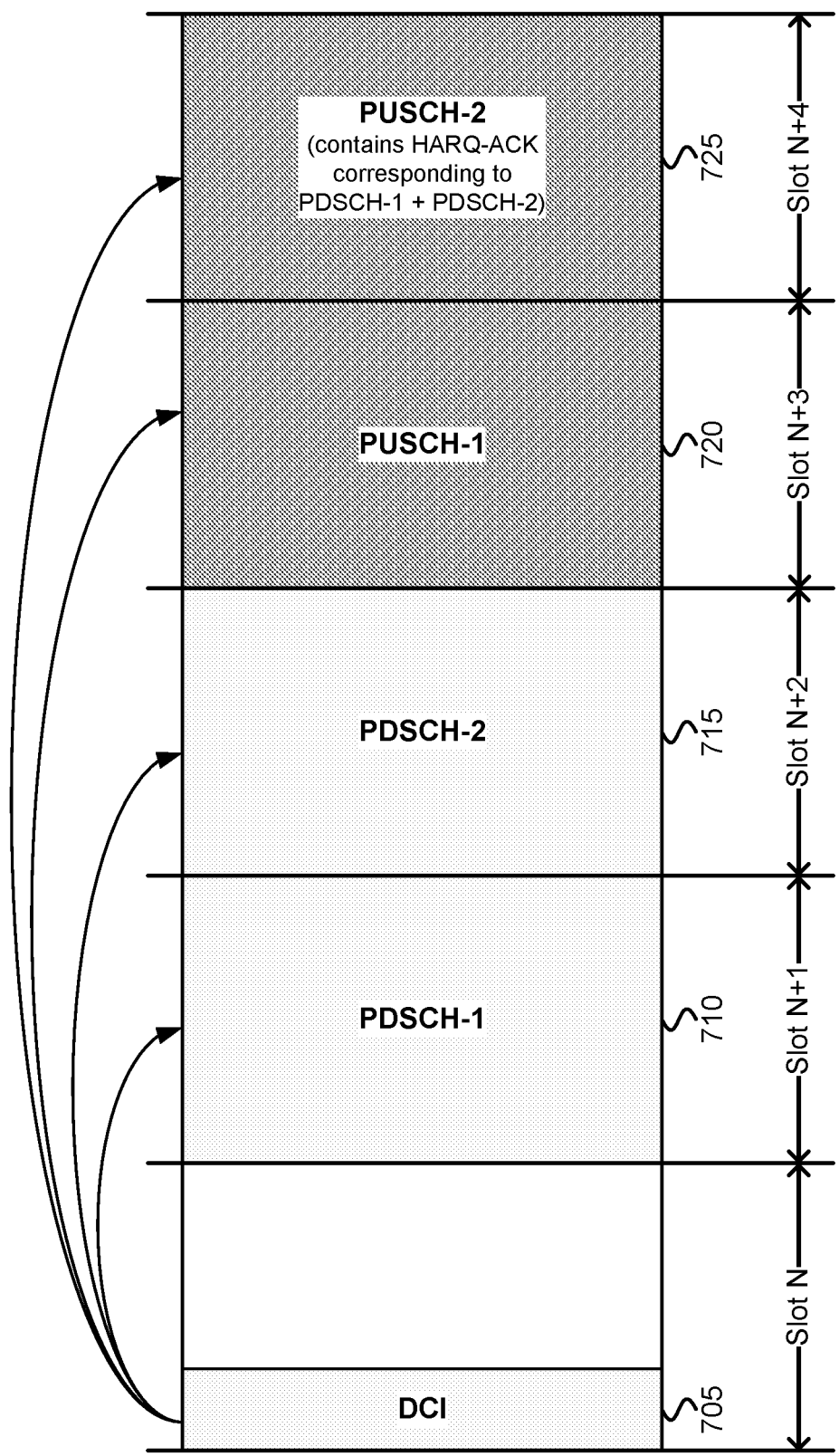
FIG. 7 is a diagram illustrating one embodiment of DL and UL scheduling with aggregated HARQ-ACK transmission on the last PUSCH resource.

FIG. 7 depicts one example scenario 700 of multiple DL resource assignment and multiple UL grant scheduling feedback information corresponding to a DL transmission received via the DL resource assignment, according to embodiments of the disclosure. In the scenario 700, the UE 205 receives a DCI 705, e.g., in symbols 0 and 1 of slot N, where the DCI 705 schedules resources 710 for DL transmission (e.g., PDSCH) in slot N+1 and schedules resources 715 for DL transmission (e.g., PDSCH) in slot N+2. Here, the DCI 705 also schedules resources 720 for UL transmission (e.g., PUSCH) in slot N+3 and resources 725 for UL transmission (e.g., PUSCH) in slot N+4.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

In the scenario 700, the aggregated HARQ-ACK feedback corresponding to all the PDSCH transmissions is sent on the last PUSCH resource scheduled by the same DCI. Thus, HARQ feedback for DL transmission(s) in PDSCH resources 710 and HARQ feedback for DL transmission(s) in PDSCH resources 715 is aggregated and transmitted using one or more of PUSCH resources 725. In the depicted embodiment, a PDSCH-to-HARQ_feedback timing indicator field, if present in the DCI, is therefore ignored.

In another implementation the HARQ-ACK aggregation factor is signaled to UE, wherein the HARQ-ACK aggregation factor indicates the number of PDSCHs after which an aggregated HARQ-ACK feedback is sent on one of PUSCH resources scheduled by the same DCI.

In subsequent description, "HARQ-ACK" should be understood as non-aggregated HARQ-ACK as well as aggregated HARQ-ACK, unless explicitly stated otherwise.

In an implementation, the HARQ feedback for indicated PDSCH data blocks by a DCI are transmitted in one of the PUSCH resources indicated by a DCI that is being transmitted in the same transmission interval (such as a slot) as the DCI indicating the transmission resources of the PDSCH data blocks. The PUSCH resource is determined as the earliest one that follows the assigned PDSCH resources. A PDSCH-to-HARQ_feedback timing indicator field, if present in the DCI, is therefore ignored.

As an implementation option, the determined PUSCH resource is determined as the earliest one after an offset following the assigned PDSCH resources. The offset can be used to accommodate for the processing time required to decode the data block(s) in the assigned PDSCH resource(s) and/or the processing time required to generate the corresponding HARQ-ACK transmission. The offset can be a configurable value given in units of, e.g., symbols, slots, samples, or other suitable time units.

The time unit of the offset may be a function of a reference subcarrier spacing, especially if resources with a plurality of subcarrier spacings are assigned, such as the smallest configured or assigned subcarrier spacing, or a pre-configured subcarrier spacing. The offset may be alternatively or additionally indicated in the resource assignment in a field.

For example, the PDSCH-to-HARQ_feedback timing indicator field could be used or replaced by a field indicating the applicable offset value. In any case, the offset value can result in a case that the HARQ-ACK feedback is transmitted not in the first of a plurality of assigned PUSCH resources but a later one, e.g., in the second PUSCH resource such as the second slot of assigned PUSCH resources.

To establish more time for the transmission of the HARQ-ACK information, the transmission of said information on the PUSCH resource is achieved by multiplexing said HARQ-ACK information only in the later part of a PUSCH slot (or other applicable scheduling unit) as exemplarily shown in FIG. 8 and FIG. 9. In one implementation, the starting symbol for such multiplexing is configured or indicated as an offset to the beginning or the end of the slot boundary at the start or the end of a PUSCH slot (or other applicable scheduling unit). Alternatively, a HARQ-ACK multiplexing duration can be configured or indicated, which is counted from the end of the determined PUSCH resource.

Figure 8:
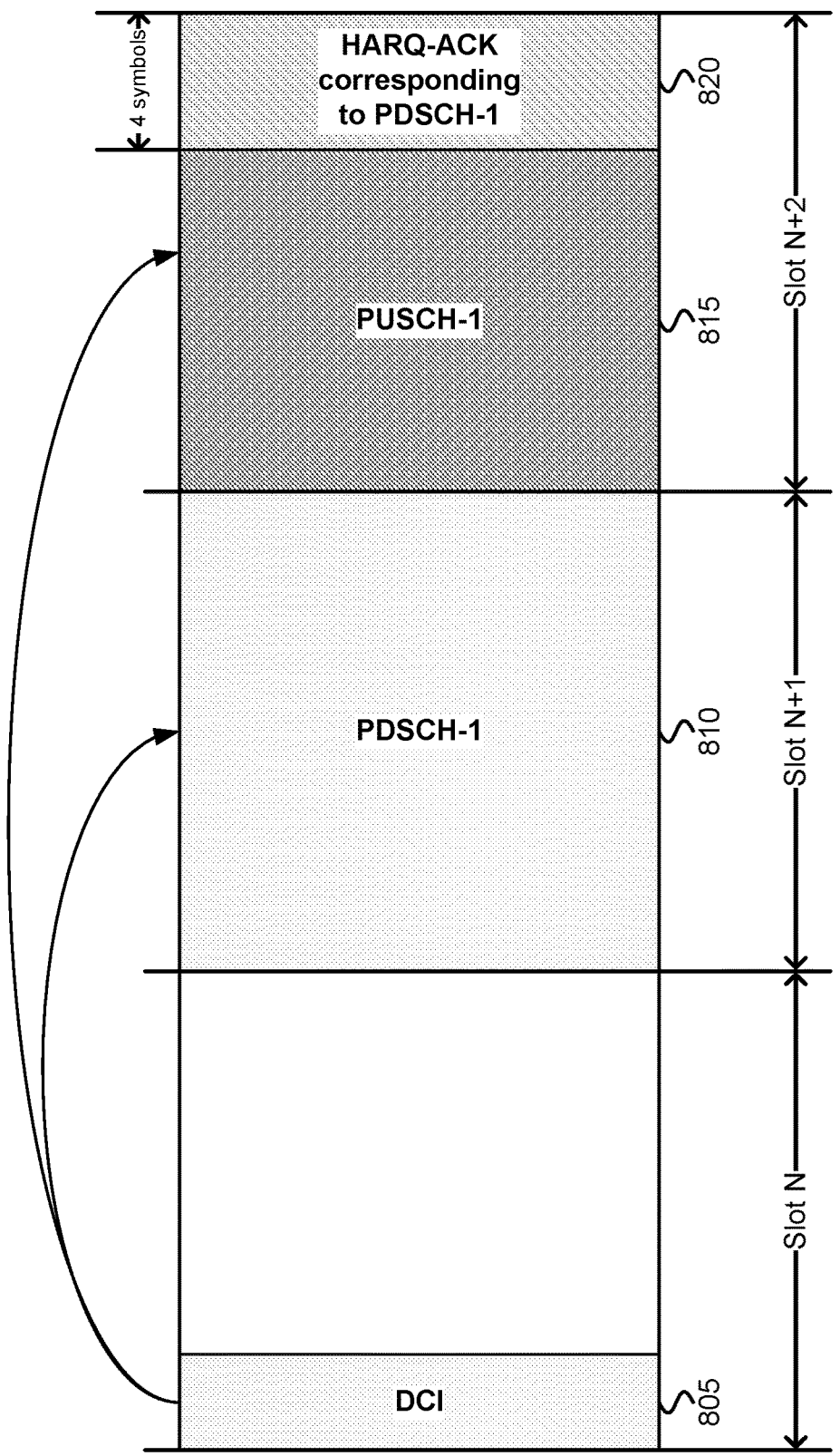
FIG. 8 is a diagram illustrating one embodiment of DL and UL scheduling with HARQ-ACK transmission at the end of the determined PUSCH resource.
Figure 9:
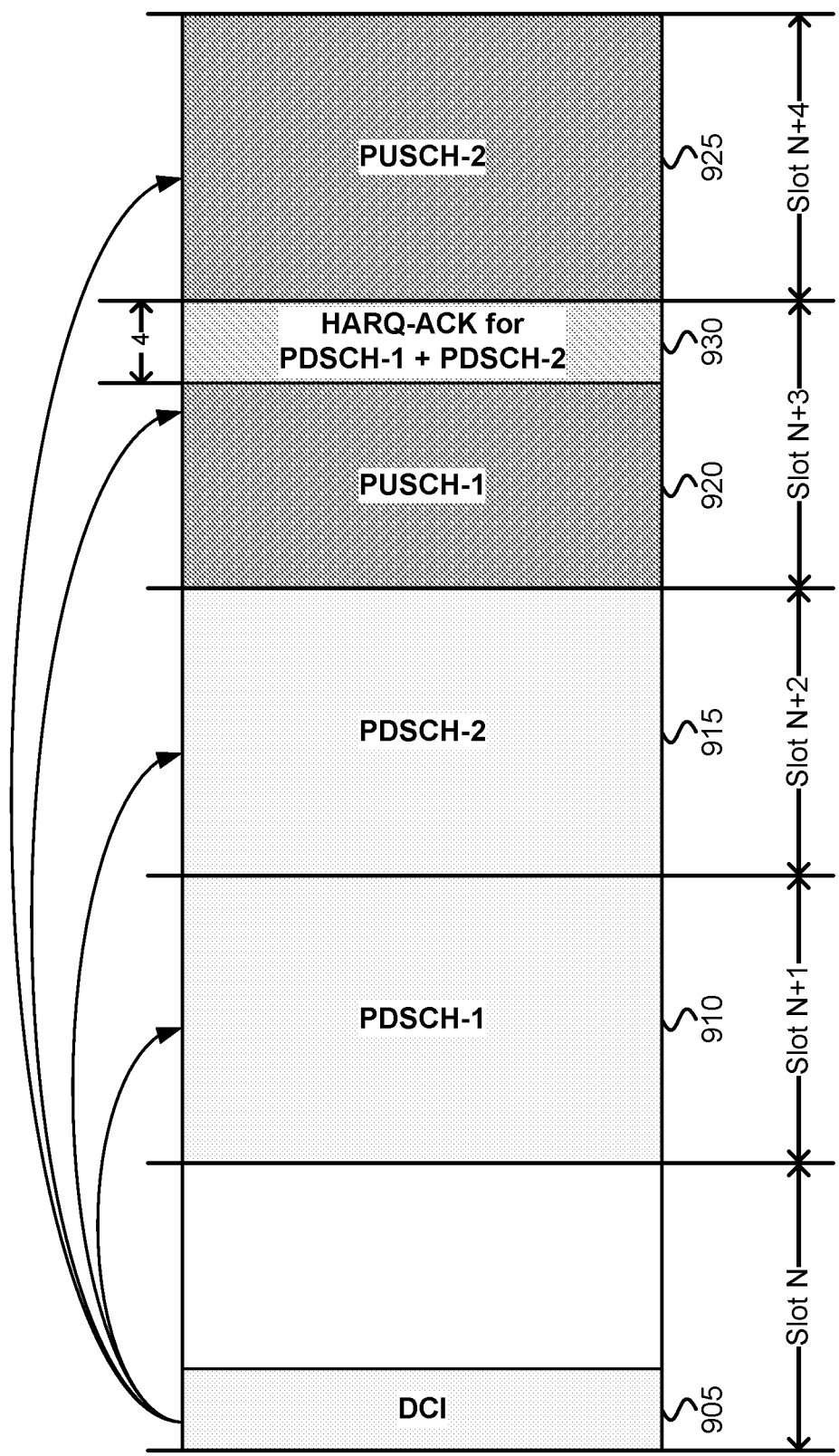
FIG. 9 is a diagram illustrating another embodiment of DL and UL scheduling with HARQ-ACK transmission at the end of the determined PUSCH resource.

For example, assuming a PUSCH slot has a duration of fourteen (14) symbols, FIG. 8 and FIG. 9 show the case where the multiplexing of HARQ-ACK information occurs only in the last four (4) symbols of the determined PUSCH resource. In this example this leaves ten (10) symbols time for processing the last PDSCH data block and determining/preparing the HARQ-ACK information.

FIG. 8 depicts one example scenario 800 of DL resource assignment and UL grant scheduling feedback information corresponding to a DL transmission received via the DL resource assignment, where HARQ-ACK transmission occurs at the end of the determined PUSCH resource, according to embodiments of the disclosure. In the scenario 800, the UE 205 receives a DCI 805, e.g., in symbols 0 and 1 of slot N, where the DCI 805 schedules resources 810 for DL transmission (e.g., PDSCH) in slot N+1 and schedules resources 815 for UL transmission (e.g., PUSCH) in slot N+2.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

In the scenario 800, the multiplexing of HARQ-ACK information occurs only in the last four symbols 820 of the earliest TTI that follows the assigned PDSCH resources. Thus, HARQ feedback for DL transmission(s) in PDSCH resources 510 is transmitted using the last four symbols of slot N+2.

FIG. 9 depicts one example scenario 900 of DL resource assignment and UL grant scheduling feedback information corresponding to a DL transmission received via the DL resource assignment, where HARQ-ACK transmission occurs at the end of the determined PUSCH resource, according to embodiments of the disclosure.

In the scenario 900, the UE 205 receives a DCI 905, e.g., in symbols 0 and 1 of slot N, where the DCI 905 schedules resources 910 for DL transmission (e.g., PDSCH) in slot N+1 and schedules resources 915 for DL transmission (e.g., PDSCH) in slot N+2. Here, the DCI 905 also schedules resources 920 for UL transmission (e.g., PUSCH) in slot N+3 and resources 925 for UL transmission (e.g., PUSCH) in slot N+4.

The received DCI is exemplary of signaling information sent from the RAN node 210 that schedules communication resources. In the depicted embodiment, the first signaling information is a single, unified DCI containing both the UL resource grant and the DL resource grant. In other embodiments, the first signaling information contains two separate DCIs scheduling UL and DL, respectively.

In the scenario 900, the multiplexing of HARQ-ACK information occurs only in the last four symbols 930 of the earliest TTI that follows the assigned PDSCH resources. Thus, HARQ feedback for DL transmission(s) in PDSCH resources 910 and HARQ feedback for DL transmission(s) in PDSCH resources 915 is aggregated and transmitted using the last four symbols of slot N+2. In the depicted embodiment, a PDSCH-to-HARQ_feedback timing indicator field, if present in the DCI, is therefore ignored.

In one implementation, the HARQ-ACK associated with the scheduled PDSCH can be multiplexed/conveyed in the simultaneously scheduled PUSCH if the PUSCH and the HARQ-ACK have the same priority. In an implementation, a priority indication in the DCI applies to both PUSCH and HARQ-ACK. In another implementation, a first priority indication field for PUSCH and a second priority indication field for HARQ-ACK associated with the simultaneously scheduled PDSCH are provided in the DCI scheduling both PDSCH and PUSCH. In an implementation, if the first priority is different than the second priority, the UE determines a different resource than the scheduled PUSCH resource for the HARQ-ACK transmission.

In one implementation, the HARQ-ACK can be multiplexed/conveyed in the PUSCH only if the last symbol of the scheduled PDSCH is before the first symbol of the PUSCH transmission.

In an implementation, there is a field in the DCI indicating if the HARQ-ACK associated with the simultaneously scheduled PDSCH is carried in the simultaneously scheduled PUSCH. The presence of such field can be configurable.

In an implementation, the PDSCH and the PUSCH can be on different serving cells.

In one implementation, the PDSCH-to-HARQ_feedback timing indicator field is present in the DCI or is provided by RRC signaling, however, the PDSCH-to-HARQ_feedback timing indicator field is only applicable, if the simultaneously scheduled PUSCH is cancelled, e.g., due to a later sent uplink cancellation indication ("UL CI") where in that case a PUCCH resource as indicated by the PDSCH-to-HARQ_feedback timing indicator field is to be used. In one implementation, the timing of the PUSCH cancellation (e.g., the timing of UL CI) with respect to the PUCCH indicated by PDSCH-to-HARQ_feedback timing indicator field has to satisfy some timing criteria, for instance, the HARQ-ACK can be sent on the PUCCH if the PUSCH cancellation indication is received a certain time before the PUCCH.

In an implementation, if a PUCCH-Config is provided with a subslotLength, the HARQ-ACK multiplexed in the PUSCH is to be confined within certain number of symbols, such as the subslotLength.

In an implementation, if the HARQ-ACK can be multiplexed in the PUSCH if the PUSCH duration is larger than a certain number of symbols, e.g., larger than the subslotLength.

In another implementation, a maximum allowed time for HARQ-ACK transmission is applied for transmitting the HARQ-ACK for PDSCH. The maximum allowed time could be semi-statically configured by RRC signaling or dynamically indicated, which may be replacing the PDSCH-to-HARQ feedback timing indicator field in the DCI. According to this implementation, a UE is allowed to transmit HARQ-ACK transmission in at least one of the multiple scheduled PUSCH resources that are transmitted within the maximum allowed time for HARQ-ACK transmission after the DCI transmission, or alternatively after the indicated PDSCH transmission. Consequently, a UE would not need to expect a retransmission of such data blocks before the maximum allowed time for HARQ-ACK transmission expires, and may therefore ignore any such retransmission indications.

It may happen that not all the HARQ-ACK information for all assigned PDSCH data blocks is available or ready for being transmitted in the determined PUSCH resource. In such a case, the following solutions are envisaged:

According to a first embodiment, the UE is to postpone the HARQ-ACK information transmission to the earliest assigned PUSCH resource for which the HARQ-ACK information is ready for transmission.

According to a second embodiment, there is no transmission of the HARQ-ACK information in any of the assigned PUSCH resources, but rather in an indicated or configured PUCCH resource.

According to a third embodiment, there is no transmission of the HARQ-ACK information in any of the assigned PUSCH resource, but to wait for another DCI that grants resources for the transmission of HARQ-ACK information.

According to a fourth embodiment, only the HARQ-ACK information that is ready for being transmitted in the determined PUSCH is transmitted, where the readiness for being transmitted may be a function of an offset and/or a subcarrier spacing as outlined in this disclosure. Any remaining HARQ-ACK information, i.e., for remaining assigned PDSCH data blocks, is transmitted as representing a NACK indication. This is particularly suitable if the HARQ-ACK information should be transmitted with a fixed size, e.g., in case of a semi-statically determined HARQ-ACK codebook size.

According to a fifth embodiment, only the HARQ-ACK information that is ready for being transmitted in the determined PUSCH is transmitted, where the readiness for being transmitted may be a function of an offset and/or a subcarrier spacing as outlined in this disclosure. Any remaining HARQ-ACK information, i.e., for remaining assigned PDSCH data blocks, can be treated according to one of the other solutions, e.g., postponing to a later assigned PUSCH resource that leaves sufficient time for the HARQ-ACK information to become available, or transmitting said HARQ-ACK information on an indicated or configured PUCCH resource, or waiting for another DCI that grants resources for the transmission of said HARQ-ACK information.

For operation in unlicensed spectrum (also referred to as "license-exempt spectrum" or "shared spectrum"), it may happen that the UE 205 cannot access the channel for one or more uplink resources because of an already occupied channel, so that a clear channel assessment fails. This case may be resolved like the case where the HARQ-ACK information is not ready for being transmitted in the determined PUSCH resource.

In another implementation, absence of a PUCCH resource indicator field in the DCI indicating PDSCH transmission(s) implies the HARQ-ACK transmission over PUSCH using one or more above implementation.

In another implementation, UE transmit HARQ-ACK using PUCCH or PUSCH, whichever is available earlier. Such an implementation is particularly important for latency critical traffic.

In one implementation, the HARQ-ACK transmission resource is determined based on a PUCCH resource indicator field or a PUSCH resource indicator field (among multiple scheduled PUSCHs), if present, in one DCI format, among the DCI formats that have a value of a PDSCH-to-HARQ_feedback timing indicator field, if present, or a value of dl-DataToUL-ACK, or a value of dl-DataToUL-ACK-ForDCIFormat1_2 for DCI format 1_2, indicating a same slot (or a same sub-slot in case of sub-slot based HARQ-ACK feedback) for the HARQ-ACK transmission, that the UE detects and for which the UE transmits corresponding HARQ-ACK information in the PUCCH or PUSCH where, for HARQ-ACK resource determination, detected DCI formats are first indexed in an ascending order across serving cells indexes for a same PDCCH monitoring occasion and are then indexed in an ascending order across PDCCH monitoring occasion indexes.

For indexing DCI formats within a serving cell for a same PDCCH monitoring occasion, if the UE is not provided CORESETPoolIndex or is provided CORESETPoolIndex with value 0 for one or more first Control Resource Sets ("CORESETs") and is provided CORESETPoolIndex with value 1 for one or more second CORESETs on an active DL BWP of a serving cell, and with ACKNACKFeedbackMode=JointFeedback for the active UL BWP, detected DCI formats from PDCCH receptions in the first CORESETs are indexed prior to detected DCI formats from PDCCH receptions in the second CORESETs. In a specific example of this implementation, the DCI format used to determine the HARQ-ACK transmission resource is the last DCI format among said DCI formats carrying a PUCCH resource indicator field or a PUSCH resource indicator field (among multiple scheduled PUSCHs).

In one implementation addressing the case that resources are assigned on a plurality of cells or bandwidth parts ("BWPs") where different subcarrier spacings ("SCS") are being used, it is beneficial to determine the PUSCH resource to be on a cell or BWP using the smallest SCS. A small SCS corresponds to a short duration of the transmission, so that the corresponding HARQ-ACK information can be conveyed in the shortest available time, improving the overall communication efficiency.

In one implementation that is particularly applicable at a network node such as a gNB, the network node expects HARQ-ACK feedback in one or more PUSCH resources according to any of the above. However, particularly for the case where the PDSCH resource(s) and PUSCH resource(s) are not indicated by the same DCI, it may occur that the DCI recipient successfully receives the PDSCH resource assignment(s) but fails to receive the PUSCH resource assignment(s). In such a case, the network node can use the successful reception of an UL data block on the determined or a received energy on the determined PUSCH resource above a threshold level as a criterion to determine whether HARQ-ACK information is included in the PUSCH resource. Alternatively, an indicator included in the PUSCH resource may indicate whether HARQ-ACK information is included in the PUSCH resource or not. In any of these cases, if the network node determines that no HARQ-ACK information is included in the PUSCH resource, the network node may instead use an indicated or configured PUCCH resource, such as a pre-configured fallback PUCCH resource, for the reception of the HARQ-ACK information.

Figure 10:
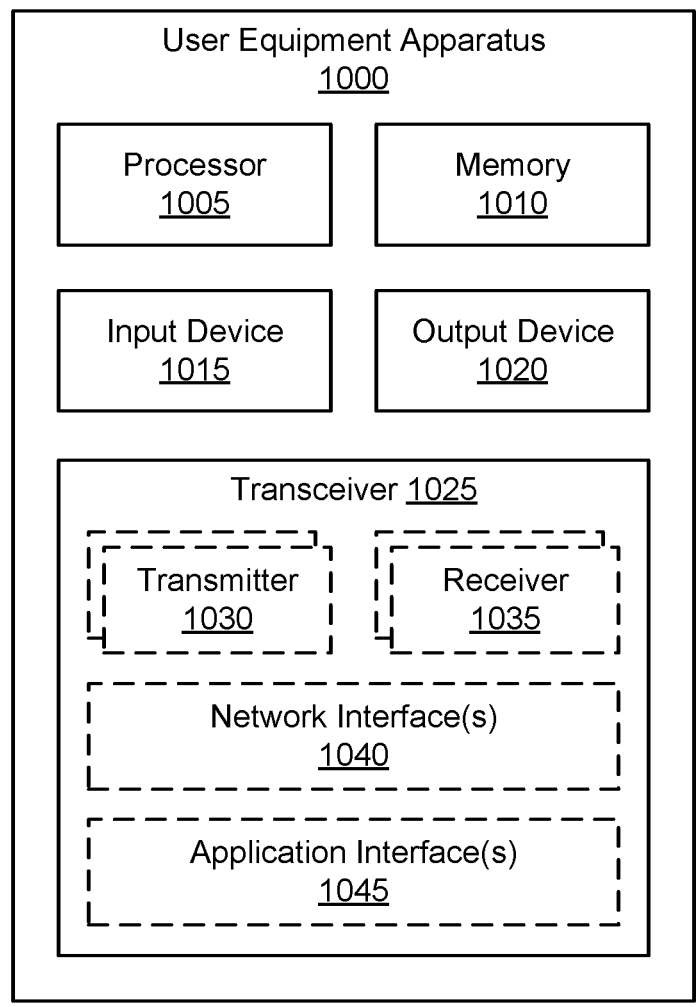
FIG. 10 is a block diagram illustrating one embodiment of a user equipment apparatus that may be used for supporting acknowledgements for DL data transmitted on UL resources.

FIG. 10 depicts a user equipment apparatus 1000 that may be used for supporting acknowledgements for DL data transmitted on UL resources, according to embodiments of the disclosure. In various embodiments, the user equipment apparatus 1000 is used to implement one or more of the solutions described above. The user equipment apparatus 1000 may be one embodiment of the remote unit 105 and/or the UE 205, described above. Furthermore, the user equipment apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the user equipment apparatus 1000 may not include any input device 1015 and/or output device 1020. In various embodiments, the user equipment apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. In some embodiments, the transceiver 1025 communicates with one or more cells (or wireless coverage areas) supported by one or more base units 121. In various embodiments, the transceiver 1025 is operable on unlicensed spectrum. Moreover, the transceiver 1025 may include multiple UE panels supporting one or more beams. Additionally, the transceiver 1025 may support at least one network interface 1040 and/or application interface 1045. The application interface(s) 1045 may support one or more APIs. The network interface(s) 1040 may support 3GPP reference points, such as Uu, N1, PC5, etc. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025.

In various embodiments, the processor 1005 controls the user equipment apparatus 1000 to implement the above described UE behaviors. In certain embodiments, the processor 1005 may include an application processor (also known as "main processor") which manages application-domain and operating system ("OS") functions and a baseband processor (also known as "baseband radio processor") which manages radio functions.

In various embodiments, the processor 1005 controls the transceiver 1025 to receive signaling information (e.g., DCI) from a RAN device (e.g., RAN node 210) to schedule a first set of PDSCH resources and a first set of corresponding PUSCH resources. The processor 1005 determines feedback information for a PDSCH transmission received from the RAN device using the first set of PDSCH resources and sends feedback information for the PDSCH transmission to the RAN device using the first set of PUSCH resources.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources. In other embodiments, the signaling information comprises a first DCI comprising a downlink resource assignment indicating the first set of PDSCH resources and a second DCI comprising an uplink grant indicating the first set of PUSCH resources.

In one embodiment, the processor 1005 ignores a PDSCH-to-HARQ_feedback timing indicator field in the first DCI. In another embodiment, the processor 1005 transmits the feedback information in an earlier opportunity selected from the first set of PUSCH resources and a transmission opportunity indicated by a PDSCH-to-HARQ_feedback timing indicator field. In some embodiments, the first set of PUSCH resources comprises PUSCH resources using different SCS values. In such embodiments, the feedback information is sent using PUSCH resources using a smallest SCS value.

In some embodiments, the feedback information comprises HARQ-ACK information. In such embodiments, the processor 1005 determines a PUSCH resource from the set of PUSCH resources for transmitting the HARQ-ACK information. In certain embodiments, the PUSCH resource for transmitting the HARQ-ACK information comprises a first transmission resource occurring after the PDSCH transmission. In certain embodiments, the determined PUSCH resource is at least a pre-determined offset of symbols after the PDSCH transmission.

In some embodiments, the processor 1005 aggregates HARQ-ACK information for multiple data blocks transmitted in the indicated set of PDSCH resources. In such embodiments, the feedback information sent using the first set of PUSCH resources comprises the aggregated HARQ-ACK information.

In some embodiments, a first priority is assigned to a PUSCH data transmission, and a second priority is assigned to a HARQ-ACK transmission. In certain embodiments, sending feedback for the PDSCH transmission using the first set of PUSCH resources comprises multiplexing uplink data and the feedback information in response to the first priority being the same as the second priority. In certain embodiments, the processor 1005 determines to use a different PUSCH resource than the first set of PUSCH resources in response to the first priority being different than the second priority.

In some embodiments, the signaling information comprises a first DCI comprising a downlink grant indicating the set of PDSCH resources and a configured uplink grant indicating the set of PUSCH resources. In such embodiments, the first DCI indicates a configuration index of the configured uplink grant. In some embodiments, the signaling information activates both a downlink semi-persistent scheduling configuration and a configured uplink grant configuration.

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to supporting acknowledgements for DL data transmitted on UL resources. For example, the memory 1010 may store various parameters, panel/beam configurations, resource assignments, policies, and the like as described above. In certain embodiments, the memory 1010 also stores program code and related data, such as an operating system or other controller algorithms operating on the apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 1020 may include a wearable display separate from, but communicatively coupled to, the rest of the user equipment apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 communicates with one or more network functions of a mobile communication network via one or more access networks. The transceiver 1025 operates under the control of the processor 1005 to transmit messages, data, and other signals and also to receive messages, data, and other signals. For example, the processor 1005 may selectively activate the transceiver 1025 (or portions thereof) at particular times in order to send and receive messages.

The transceiver 1025 includes at least transmitter 1030 and at least one receiver 1035. One or more transmitters 1030 may be used to provide UL communication signals to a base unit 121, such as the UL transmissions described herein. Similarly, one or more receivers 1035 may be used to receive DL communication signals from the base unit 121, as described herein. Although only one transmitter 1030 and one receiver 1035 are illustrated, the user equipment apparatus 1000 may have any suitable number of transmitters 1030 and receivers 1035. Further, the transmitter(s) 1030 and the receiver(s) 1035 may be any suitable type of transmitters and receivers. In one embodiment, the transceiver 1025 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1025, transmitters 1030, and receivers 1035 may be implemented as physically separate components that access a shared hardware resource and/or software resource, such as for example, the network interface 1040.

In various embodiments, one or more transmitters 1030 and/or one or more receivers 1035 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 1030 and/or one or more receivers 1035 may be implemented and/or integrated into a multi-chip module. In some embodiments, other components such as the network interface 1040 or other hardware components/circuits may be integrated with any number of transmitters 1030 and/or receivers 1035 into a single chip. In such embodiment, the transmitters 1030 and receivers 1035 may be logically configured as a transceiver 1025 that uses one more common control signals or as modular transmitters 1030 and receivers 1035 implemented in the same hardware chip or in a multi-chip module.

Figure 11:
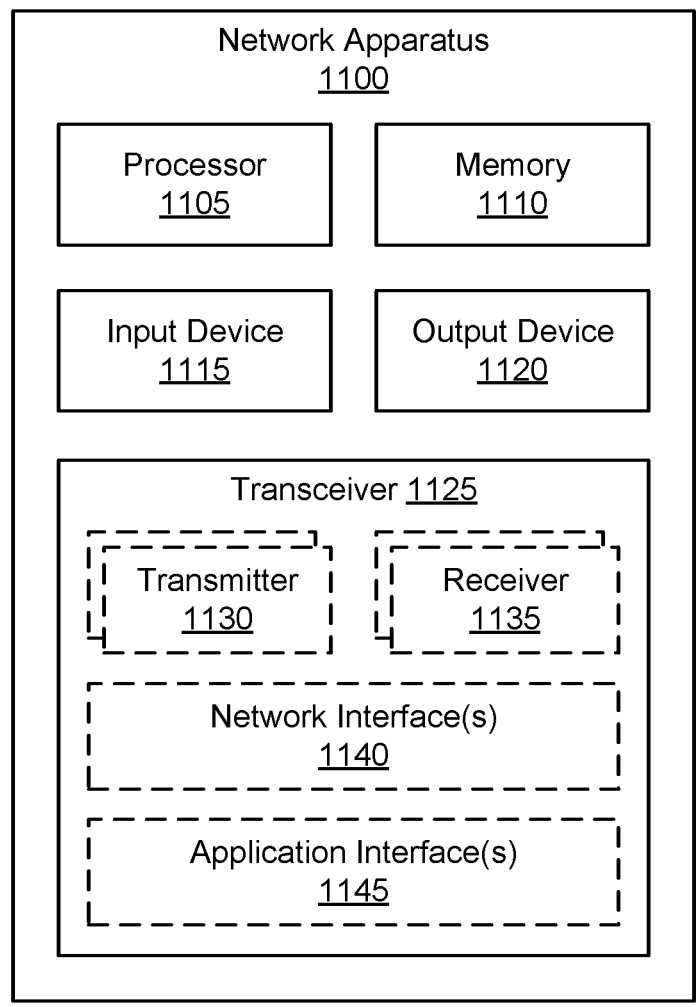
FIG. 11 is a block diagram illustrating one embodiment of a network equipment apparatus that may be used for supporting acknowledgements for DL data transmitted on UL resources.

FIG. 11 depicts a network apparatus 1100 that may be used for supporting acknowledgements for DL data transmitted on UL resources, according to embodiments of the disclosure. In one embodiment, network apparatus 1100 may be one implementation of a RAN node, such as the base unit 121 and/or the RAN node 210, as described above. Furthermore, the base network apparatus 1100 may include a processor 1105, a memory 1110, an input device 1115, an output device 1120, and a transceiver 1125.

In some embodiments, the input device 1115 and the output device 1120 are combined into a single device, such as a touchscreen. In certain embodiments, the network apparatus 1100 may not include any input device 1115 and/or output device 1120. In various embodiments, the network apparatus 1100 may include one or more of: the processor 1105, the memory 1110, and the transceiver 1125, and may not include the input device 1115 and/or the output device 1120.

As depicted, the transceiver 1125 includes at least one transmitter 1130 and at least one receiver 1135. Here, the transceiver 1125 communicates with one or more remote units 115. Additionally, the transceiver 1125 may support at least one network interface 1140 and/or application interface 1145. The application interface(s) 1145 may support one or more APIs. The network interface(s) 1140 may support 3GPP reference points, such as Uu, N1, N2 and N3. Other network interfaces 1140 may be supported, as understood by one of ordinary skill in the art.

The processor 1105, in one embodiment, may include any known controller capable of executing computer-readable instructions and/or capable of performing logical operations. For example, the processor 1105 may be a microcontroller, a microprocessor, a CPU, a GPU, an auxiliary processing unit, a FPGA, or similar programmable controller. In some embodiments, the processor 1105 executes instructions stored in the memory 1110 to perform the methods and routines described herein. The processor 1105 is communicatively coupled to the memory 1110, the input device 1115, the output device 1120, and the transceiver 1125.

In various embodiments, the network apparatus 1100 is a RAN node (e.g., gNB) that communicates with one or more UEs, as described herein. In such embodiments, the processor 1105 controls the network apparatus 1100 to perform the above described RAN behaviors. When operating as a RAN node, the processor 1105 may include an application processor (also known as "main processor") which manages application-domain and operating system ("OS") functions and a baseband processor (also known as "baseband radio processor") which manages radio functions.

In various embodiments, the processor 1105 controls the transceiver 1125 to transmit signaling information (e.g., DCI) to a UE to schedule a first set of PDSCH resources and a first set of corresponding PUSCH resources. The transceiver 1125 also transmits a PDSCH transmission to the UE using the first set of PDSCH resources and receives feedback information from the UE using the first set of PUSCH resources for the PDSCH transmission.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources.

In other embodiments, the signaling information comprises a first DCI comprising a downlink resource assignment indicating the set of PDSCH resources and a second DCI comprising an uplink grant indicating the set of PUSCH resources. In such embodiments, the node expects to receive the feedback information in the first set of PUSCH resources. In one embodiment, the feedback information is received in an earlier opportunity selected from the first set of PUSCH resources and a transmission opportunity indicated by a PDSCH-to-HARQ_feedback timing indicator field.

In some embodiments, the first set of PUSCH resources comprises PUSCH resources using different SCS values. In such embodiments, the feedback information is sent using PUSCH resources using a smallest SCS value. In some embodiments, the feedback information comprises HARQ-ACK information. In such embodiments, the PUSCH resource for transmitting the HARQ-ACK information comprises a first transmission resource occurring after the PDSCH transmission.

In some embodiments, the feedback information comprises HARQ-ACK information, where the PUSCH resource carrying the HARQ-ACK information is at least a pre-determined offset of symbols after the PDSCH transmission. In some embodiments, feedback information received in the first set of PUSCH resources comprises aggregated HARQ-ACK information for multiple data blocks transmitted in the indicated set of PDSCH resources.

In some embodiments, a first priority is assigned to a PUSCH data transmission, and a second priority is assigned to a HARQ-ACK transmission. In such embodiments, receiving the feedback information for the PDSCH transmission using the first set of PUSCH resources comprises receiving multiplexed uplink data with the feedback information in response to the first priority being the same as the second priority.

In some embodiments, the first signaling information comprises a first DCI comprising a downlink grant indicating the set of PDSCH resources and a configured uplink grant indicating the set of PUSCH resources, where the first DCI indicates a configuration index of the configured uplink grant. In some embodiments, the first signaling information activates both a downlink semi-persistent scheduling configuration and a configured uplink grant configuration.

The memory 1110, in one embodiment, is a computer readable storage medium. In some embodiments, the memory 1110 includes volatile computer storage media. For example, the memory 1110 may include a RAM, including dynamic RAM ("DRAM"), synchronous dynamic RAM ("SDRAM"), and/or static RAM ("SRAM"). In some embodiments, the memory 1110 includes non-volatile computer storage media. For example, the memory 1110 may include a hard disk drive, a flash memory, or any other suitable non-volatile computer storage device. In some embodiments, the memory 1110 includes both volatile and non-volatile computer storage media.

In some embodiments, the memory 1110 stores data related to supporting acknowledgements for DL data transmitted on UL resources. For example, the memory 1110 may store parameters, configurations, resource assignments, policies, and the like, as described above. In certain embodiments, the memory 1110 also stores program code and related data, such as an operating system or other controller algorithms operating on the apparatus 1100.

The input device 1115, in one embodiment, may include any known computer input device including a touch panel, a button, a keyboard, a stylus, a microphone, or the like. In some embodiments, the input device 1115 may be integrated with the output device 1120, for example, as a touchscreen or similar touch-sensitive display. In some embodiments, the input device 1115 II) includes a touchscreen such that text may be input using a virtual keyboard displayed on the touchscreen and/or by handwriting on the touchscreen. In some embodiments, the input device 1115 includes two or more different devices, such as a keyboard and a touch panel.

The output device 1120, in one embodiment, is designed to output visual, audible, and/or haptic signals. In some embodiments, the output device 1120 includes an electronically controllable display or display device capable of outputting visual data to a user. For example, the output device 1120 may include, but is not limited to, an LCD display, an LED display, an OLED display, a projector, or similar display device capable of outputting images, text, or the like to a user. As another, non-limiting, example, the output device 1120 may include a wearable display separate from, but communicatively coupled to, the rest of the network apparatus 1100, such as a smart watch, smart glasses, a heads-up display, or the like. Further, the output device 1120 may be a component of a smart phone, a personal digital assistant, a television, a table computer, a notebook (laptop) computer, a personal computer, a vehicle dashboard, or the like.

In certain embodiments, the output device 1120 includes one or more speakers for producing sound. For example, the output device 1120 may produce an audible alert or notification (e.g., a beep or chime). In some embodiments, the output device 1120 includes one or more haptic devices for producing vibrations, motion, or other haptic feedback. In some embodiments, all or portions of the output device 1120 may be integrated with the input device 1115. For example, the input device 1115 and output device 1120 may form a touchscreen or similar touch-sensitive display. In other embodiments, the output device 1120 may be located near the input device 1115.

The transceiver 1125 includes at least transmitter 1130 and at least one receiver 1135. One or more transmitters 1130 may be used to communicate with the UE, as described herein. Similarly, one or more receivers 1135 may be used to communicate with network functions in the PLMN and/or RAN, as described herein. Although only one transmitter 1130 and one receiver 1135 are illustrated, the network apparatus 1100 may have any suitable number of transmitters 1130 and receivers 1135. Further, the transmitter(s) 1130 and the receiver(s) 1135 may be any suitable type of transmitters and receivers.

Figure 12:
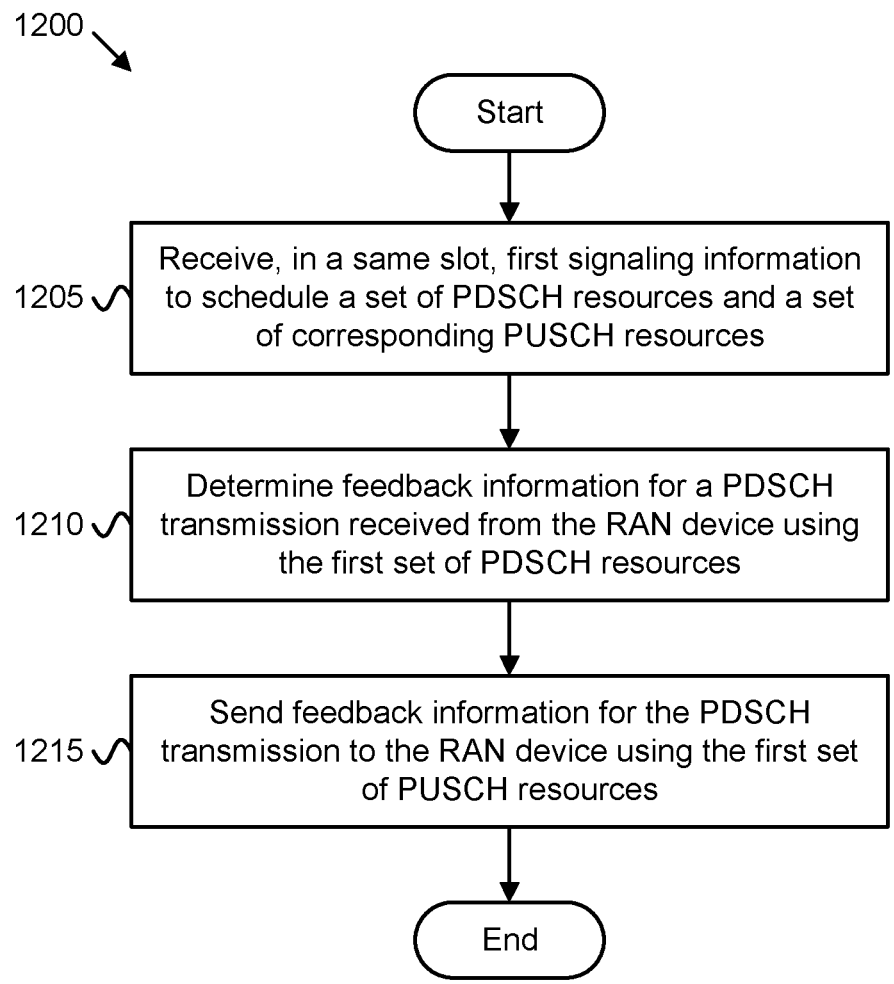
FIG. 12 is a block diagram illustrating one embodiment of a first method for supporting acknowledgements for DL data transmitted on UL resources.

FIG. 12 depicts one embodiment of a method 1200 for supporting acknowledgements for DL data transmitted on UL resources, according to embodiments of the disclosure. In various embodiments, the method 1200 is performed by a user equipment device in a mobile communication network, such as the remote unit 105, the UE 205, and/or the user equipment apparatus 1300, described above. In some embodiments, the method 1200 is performed by a processor, such as a microcontroller, a microprocessor, a CPU, a GPU, an auxiliary processing unit, a FPGA, or the like.

The method 1200 begins and receives 1205 signaling information (e.g., DCI) from a RAN node to schedule a first set of PDSCH resources and a first set of corresponding PUSCH resources, where the information to schedule the first set of PDSCH resources and the first set of PUSCH resources is transmitted in a same slot. The method 1200 includes determining 1210 feedback information for a PDSCH transmission received from the RAN node using the first set of PDSCH resources. The method 1200 includes sending 1215 feedback information for the PDSCH transmission to the RAN node using the first set of PUSCH resources. The method 1200 ends.

Figure 13:
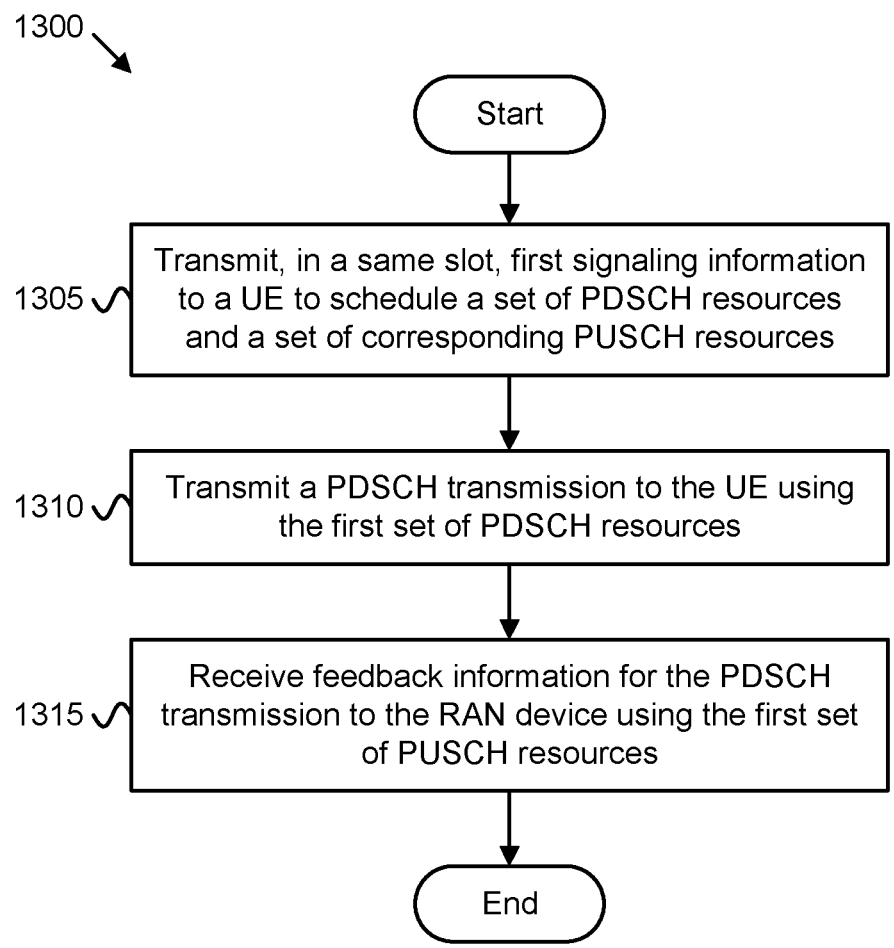
FIG. 13 is a block diagram illustrating one embodiment of a second method for supporting acknowledgements for DL data transmitted on UL resources.

FIG. 13 depicts one embodiment of a method 1300 for supporting acknowledgements for DL data transmitted on UL resources, according to embodiments of the disclosure. In various embodiments, the method 1300 is performed by a Location Management Function in a mobile communication network, such as the base unit 121, the RAN node 210, and/or the network apparatus 1100, described above. In some embodiments, the method 1300 is performed by a processor, such as a microcontroller, a microprocessor, a CPU, a GPU, an auxiliary processing unit, a FPGA, or the like.

The method 1300 begins and transmits 1305 first signaling information (e.g., DCI) to a UE to schedule a first set of PDSCH resources and a first set of corresponding PUSCH resources, where the information to schedule the first set of PDSCH resources and the first set of PUSCH resources is transmitted in a same slot. The method 1300 includes transmitting 1310 a PDSCH transmission to the UE using the first set of PDSCH resources. The method 1300 includes receiving 1315 feedback information from the UE using the first set of PUSCH resources for the PDSCH transmission. The method 1300 ends.

Disclosed herein is a first apparatus for supporting acknowledgements for DL data transmitted on UL resources, according to embodiments of the disclosure. The first apparatus may be implemented by a user equipment device in a mobile communication network, such as the remote unit 105, the UE 205, and/or the user equipment apparatus 1000, described above. The first apparatus includes a processor and a transceiver that receives signaling information (e.g., DCI) from a RAN device to schedule a first set of PDSCH resources and a first set of corresponding PUSCH resources. The processor that determines feedback information for a PDSCH transmission received from the RAN device using the first set of PDSCH resources and sends feedback information for the PDSCH transmission to the RAN device using the first set of PUSCH resources.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources. In other embodiments, the signaling information comprises a first DCI comprising a downlink resource assignment indicating the first set of PDSCH resources and a second DCI comprising an uplink grant indicating the first set of PUSCH resources.

In one embodiment, the processor ignores a PDSCH-to-HARQ_feedback timing indicator field in the first DCI. In another embodiment, the processor transmits the feedback information in an earlier opportunity selected from the first set of PUSCH resources and a transmission opportunity indicated by a PDSCH-to-HARQ_feedback timing indicator field. In some embodiments, the first set of PUSCH resources comprises PUSCH resources using different SCS values. In such embodiments, the feedback information is sent using PUSCH resources using a smallest SCS value.

In some embodiments, the feedback information comprises HARQ-ACK information. In such embodiments, the processor determines a PUSCH resource from the set of PUSCH resources for transmitting the HARQ-ACK information. In certain embodiments, the PUSCH resource for transmitting the HARQ-ACK information comprises a first transmission resource occurring after the PDSCH transmission. In certain embodiments, the determined PUSCH resource is at least a pre-determined offset of symbols after the PDSCH transmission.

In some embodiments, the processor aggregates HARQ-ACK information for multiple data blocks transmitted in the indicated set of PDSCH resources. In such embodiments, the feedback information sent using the first set of PUSCH resources comprises the aggregated HARQ-ACK information.

In some embodiments, a first priority is assigned to a PUSCH data transmission, and a second priority is assigned to a HARQ-ACK transmission. In certain embodiments, sending feedback for the PDSCH transmission using the first set of PUSCH resources comprises multiplexing uplink data and the feedback information in response to the first priority being the same as the second priority. In certain embodiments, the processor determines to use a different PUSCH resource than the first set of PUSCH resources in response to the first priority being different than the second priority.

In some embodiments, the signaling information comprises a first DCI comprising a downlink grant indicating the set of PDSCH resources and a configured uplink grant indicating the set of PUSCH resources. In such embodiments, the first DCI indicates a configuration index of the configured uplink grant. In some embodiments, the signaling information activates both a downlink semi-persistent scheduling configuration and a configured uplink grant configuration.

Disclosed herein is a first method for supporting acknowledgements for DL data transmitted on UL resources, according to embodiments of the disclosure. The first method may be performed by a user equipment device in a mobile communication network, such as the remote unit 105, the UE 205, and/or the user equipment apparatus 1000, described above. The first method includes receiving signaling information (e.g., DCI) from a RAN device to schedule a first set of PDSCH resources and a first set of corresponding PUSCH resources, determining feedback information for a PDSCH transmission received from the RAN device using the first set of PDSCH resources, and sending feedback information for the PDSCH transmission to the RAN device using the first set of PUSCH resources.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources. In other embodiments, the signaling information comprises a first DCI comprising a downlink resource assignment indicating the first set of PDSCH resources and a second DCI comprising an uplink grant indicating the first set of PUSCH resources.

In one embodiment, the first method includes ignoring a PDSCH-to-HARQ_feedback timing indicator field in the first DCI. In another embodiment, the first method includes transmitting the feedback information in an earlier opportunity selected from the first set of PUSCH resources and a transmission opportunity indicated by a PDSCH-to-HARQ_feedback timing indicator field. In some embodiments, the first set of PUSCH resources comprises PUSCH resources using different SCS values. In such embodiments, the feedback information is sent using PUSCH resources using a smallest SCS value.

In some embodiments, the feedback information comprises HARQ-ACK information. In such embodiments, the first method includes determining a PUSCH resource from the set of PUSCH resources for transmitting the HARQ-ACK information. In certain embodiments, the PUSCH resource for transmitting the HARQ-ACK information comprises a first transmission resource occurring after the PDSCH transmission. In certain embodiments, the determined PUSCH resource is at least a pre-determined offset of symbols after the PDSCH transmission.

In some embodiments, the first method includes aggregating HARQ-ACK information for multiple data blocks transmitted in the indicated set of PDSCH resources. In such embodiments, the feedback information sent using the first set of PUSCH resources comprises the aggregated HARQ-ACK information.

In some embodiments, a first priority is assigned to a PUSCH data transmission, and a second priority is assigned to a HARQ-ACK transmission. In such embodiments, sending feedback for the PDSCH transmission using the first set of PUSCH resources includes multiplexing uplink data and the feedback information in response to the first priority being the same as the second priority. In certain embodiments, the first method includes determining to use a different PUSCH resource than the first set of PUSCH resources in response to the first priority being different than the second priority.

In some embodiments, the first signaling information comprises a first DCI comprising a downlink grant indicating the set of PDSCH resources and a configured uplink grant indicating the set of PUSCH resources. In such embodiments, the first DCI indicates a configuration index of the configured uplink grant. In some embodiments, the first signaling information activates both a downlink semi-persistent scheduling configuration and a configured uplink grant configuration.

Disclosed herein is a second apparatus for supporting acknowledgements for DL data transmitted on UL resources, according to embodiments of the disclosure. The second apparatus may be implemented by a RAN device in a mobile communication network, such as the base unit 121, the RAN node 210, and/or the network apparatus 1100, described above. The second apparatus includes a processor and a transceiver that transmits signaling information (e.g., DCI) to a UE to schedule a first set of PDSCH resources and a first set of corresponding PUSCH resources. The transceiver transmits a PDSCH transmission to the UE using the first set of PDSCH resources and receives feedback information from the UE using the first set of PUSCH resources for the PDSCH transmission.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources.

In other embodiments, the signaling information comprises a first DCI comprising a downlink resource assignment indicating the set of PDSCH resources and a second DCI comprising an uplink grant indicating the set of PUSCH resources. In such embodiments, the node expects to receive the feedback information in the first set of PUSCH resources. In one embodiment, the feedback information is received in an earlier opportunity selected from the first set of PUSCH resources and a transmission opportunity indicated by a PDSCH-to-HARQ_feedback timing indicator field.

In some embodiments, the first set of PUSCH resources comprises PUSCH resources using different SCS values. In such embodiments, the feedback information is sent using PUSCH resources using a smallest SCS value. In some embodiments, the feedback information comprises HARQ-ACK information. In such embodiments, the PUSCH resource for transmitting the HARQ-ACK information comprises a first transmission resource occurring after the PDSCH transmission.

In some embodiments, the feedback information comprises HARQ-ACK information, where the PUSCH resource carrying the HARQ-ACK information is at least a pre-determined offset of symbols after the PDSCH transmission. In some embodiments, feedback information received in the first set of PUSCH resources comprises aggregated HARQ-ACK information for multiple data blocks transmitted in the indicated set of PDSCH resources.

In some embodiments, a first priority is assigned to a PUSCH data transmission, and a second priority is assigned to a HARQ-ACK transmission. In such embodiments, receiving the feedback information for the PDSCH transmission using the first set of PUSCH resources comprises receiving multiplexed uplink data with the feedback information in response to the first priority being the same as the second priority.

In some embodiments, the first signaling information comprises a first DCI comprising a downlink grant indicating the set of PDSCH resources and a configured uplink grant indicating the set of PUSCH resources, where the first DCI indicates a configuration index of the configured uplink grant. In some embodiments, the first signaling information activates both a downlink semi-persistent scheduling configuration and a configured uplink grant configuration.

Disclosed herein is a second method for supporting acknowledgements for DL data transmitted on UL resources, according to embodiments of the disclosure. The second method may be performed by a RAN device in a mobile communication network, such as the base unit 121, the RAN node 210, and/or the network apparatus 1100, described above. The second method includes transmitting first signaling information (e.g., DCI) to a UE to schedule a first set of PDSCH resources and a first set of corresponding PUSCH resources. The second method includes transmitting a PDSCH transmission to the UE using the first set of PDSCH resources and receiving feedback information from the UE using the first set of PUSCH resources for the PDSCH transmission.

In some embodiments, the signaling information to schedule the first set of PDSCH resources and the first set of PUSCH resources is received in a same slot. In certain embodiments, the signaling information comprises a unified DCI format comprising both a downlink resource assignment indicating the set of PDSCH resources and an uplink grant indicating the set of PUSCH resources.

In other embodiments, the signaling information comprises a first DCI comprising a downlink resource assignment indicating the set of PDSCH resources and a second DCI comprising an uplink grant indicating the set of PUSCH resources. In such embodiments, the node expects to receive the feedback information in the first set of PUSCH resources. In one embodiment, the feedback information is received in an earlier opportunity selected from the first set of PUSCH resources and a transmission opportunity indicated by a PDSCH-to-HARQ_feedback timing indicator field.

In some embodiments, the first set of PUSCH resources comprises PUSCH resources using different SCS values. In such embodiments, the feedback information is sent using PUSCH resources using a smallest SCS value. In some embodiments, the feedback information comprises HARQ-ACK information. In such embodiments, the PUSCH resource for transmitting the HARQ-ACK information comprises a first transmission resource occurring after the PDSCH transmission.

In some embodiments, the feedback information comprises HARQ-ACK information, where the PUSCH resource carrying the HARQ-ACK information is at least a pre-determined offset of symbols after the PDSCH transmission. In some embodiments, feedback information received in the first set of PUSCH resources comprises aggregated HARQ-ACK information for multiple data blocks transmitted in the indicated set of PDSCH resources.

In some embodiments, a first priority is assigned to a PUSCH data transmission, and a second priority is assigned to a HARQ-ACK transmission. In such embodiments, receiving the feedback information for the PDSCH transmission using the first set of PUSCH resources comprises receiving multiplexed uplink data with the feedback information in response to the first priority being the same as the second priority.

In some embodiments, the first signaling information comprises a first DCI comprising a downlink grant indicating the set of PDSCH resources and a configured uplink grant indicating the set of PUSCH resources, where the first DCI indicates a configuration index of the configured uplink grant. In some embodiments, the first signaling information activates both a downlink semi-persistent scheduling configuration and a configured uplink grant configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") comprising:
at least one memory; and
at least one processor coupled with the at least one memory and configured to cause the UE to:
receive signaling information from a Radio Access Network ("RAN") device to schedule a first set of Physical Downlink Shared Channel ("PDSCH") resources and a first set of corresponding Physical Uplink Shared Channel ("PUSCH") resources, wherein the signaling information to schedule the first set of PDSCH resources and the first set of PUSCH resources is received in a same slot;
determine feedback information for a PDSCH transmission received from the RAN device using the first set of PDSCH resources;
determine a PUSCH resource from the first set of corresponding PUSCH resources for transmitting the feedback information, wherein the PUSCH resource for transmitting the feedback information comprises an earliest transmit time interval ("TTI") occurring after a TTI of the PDSCH transmission; and
transmit the feedback information for the PDSCH transmission to the RAN device using the PUSCH resource of the first set of PUSCH resources.

2. The UE of claim 1, wherein the signaling information comprises a unified Downlink Control Information ("DCI") format comprising both a downlink resource assignment indicating the first set of PDSCH resources and an uplink grant indicating the first set of PUSCH resources.

3. The UE of claim 1, wherein the signaling information comprises a first Downlink Control Information ("DCI") comprising a downlink resource assignment indicating the first set of PDSCH resources and a second DCI comprising an uplink grant indicating the first set of PUSCH resources.

4. The UE of claim 3, wherein the at least one processor is configured to cause the UE to ignore a PDSCH-to-HARQ feedback timing indicator field in the first DCI.

5. The UE of claim 1, wherein the first set of PUSCH resources comprises PUSCH resources using different subcarrier spacing ("SCS") values, wherein the feedback information is sent using PUSCH resources using a smallest SCS value.

6. The UE of claim 1, wherein the feedback information comprises Hybrid Automatic Repeat Request Acknowledgement ("HARQ-ACK") information, and wherein the PUSCH resource for transmitting the HARQ-ACK information comprises a first transmission resource occurring after the PDSCH transmission.

7. The UE of claim 1, wherein the feedback information comprises Hybrid Automatic Repeat Request Acknowledgement ("HARQ-ACK") information, and wherein the PUSCH resource is at least a pre-determined offset of symbols after the PDSCH transmission.

8. The UE of claim 1, wherein the at least one processor is configured to cause the UE to aggregate Hybrid Automatic Repeat Request Acknowledgement ("HARQ-ACK") information for multiple data blocks transmitted in the first set of PDSCH resources into aggregated HARQ-ACK information, wherein feedback information sent using the first set of PUSCH resources comprises the aggregated HARQ-ACK information.

9. The UE of claim 1, wherein a first priority is assigned to a PUSCH data transmission, and a second priority is assigned to a Hybrid Automatic Repeat Request Acknowledgement ("HARQ-ACK") transmission, wherein to transmit feedback for the PDSCH transmission using the first set of PUSCH resources, the at least one processor is configured to cause the UE to multiplex uplink data and the feedback information in response to the first priority being the same as the second priority.

10. A method of a User Equipment ("UE"), the method comprising:
receiving first signaling information from a Radio Access Network ("RAN") device to schedule a first set of Physical Downlink Shared Channel ("PDSCH") resources and a first set of corresponding Physical Uplink Shared Channel ("PUSCH") resources, wherein the information to schedule the first set of PDSCH resources and the first set of PUSCH resources is received in a same slot;
determining feedback information for a PDSCH transmission received using the first set of PDSCH resources;
determining a PUSCH resource from the first set of corresponding PUSCH resources for transmitting the feedback information, wherein the PUSCH resource for transmitting the feedback information comprises an earliest transmit time interval ("TTI") occurring after a TTI of the PDSCH transmission; and
transmitting the feedback information for the PDSCH transmission using the PUSCH resource of the first set of PUSCH resources.

11. A base station for wireless communication, comprising:
at least one memory; and
at least one processor coupled with the at least one memory and configured to cause the base station to:
transmit first signaling information to a User Equipment device ("UE") to schedule a first set of Physical Downlink Shared Channel ("PDSCH") resources and a first set of corresponding Physical Uplink Shared Channel ("PUSCH") resources, wherein the information to schedule the first set of PDSCH resources and the first set of PUSCH resources is transmitted in a same slot;

transmit a PDSCH transmission to the UE using the first set of PDSCH resources; and receive feedback information from the UE for the PDSCH transmission using a PUSCH resource of the corresponding first set of PUSCH resources, wherein the PUSCH resource comprises an earliest transmit time interval ("TTI") occurring after a TTI of the PDSCH transmission.

12. The base station of claim 11, wherein the signaling information comprises a unified Downlink Control Information ("DCI") format comprising both a downlink resource assignment indicating the first set of PDSCH resources and an uplink grant indicating the first set of PUSCH resources.

13. The base station of claim 11, wherein the signaling information comprises a first Downlink Control Information ("DCI") comprising a downlink resource assignment indicating the first set of PDSCH resources and a second DCI comprising an uplink grant indicating the first set of PUSCH resources.

14. The base station of claim 13, wherein the base station expects to receive the feedback information in the first set of corresponding PUSCH resources.

15. The base station of claim 11, wherein the feedback information comprises Hybrid Automatic Repeat Request Acknowledgement ("HARQ-ACK") information, and wherein the PUSCH resource carrying the HARQ-ACK information is at least a pre-determined offset of symbols after the PDSCH transmission.

16. The base station of claim 11, wherein feedback information received in the first set of PUSCH resources comprises aggregated Hybrid Automatic Repeat Request Acknowledgement ("HARQ-ACK") information for multiple data blocks transmitted in the first set of PDSCH resources.

17. The base station of claim 16, wherein feedback information sent using the first set of PUSCH resources comprises the aggregated HARQ-ACK information.

18. The base station of claim 11, wherein the feedback information comprises Hybrid Automatic Repeat Request Acknowledgement ("HARQ-ACK") information, wherein the PUSCH resource comprising the HARQ-ACK information comprises a first transmission resource occurring after the PDSCH transmission.

19. The base station of claim 11, wherein the first set of PUSCH resources comprises PUSCH resources using different subcarrier spacing ("SCS") values, wherein the feedback information is sent using PUSCH resources using a smallest SCS value.

20. The base station of claim 11, wherein a first priority is assigned to a PUSCH data transmission, and a second priority is assigned to a Hybrid Automatic Repeat Request Acknowledgement ("HARQ-ACK") transmission, wherein the PUSCH data transmission comprises uplink data multiplexed with the feedback information in response to the first priority being the same as the second priority.

* * * * *